(12) United States Patent
Kapcia

(10) Patent No.: US 10,842,012 B2
(45) Date of Patent: Nov. 17, 2020

(54) METHODS AND SYSTEMS FOR PLASMA SELF-COMPRESSION

(71) Applicant: Aceleron, Inc., Molalla, OR (US)

(72) Inventor: Jason Kapcia, Hillsboro, OR (US)

(73) Assignee: Aceleron, Inc., Molalla, OR (US)

( * ) Notice: Subject to any disclaimer, the term of this patent is extended or adjusted under 35 U.S.C. 154(b) by 0 days.

(21) Appl. No.: 16/601,319

(22) Filed: Oct. 14, 2019

(65) Prior Publication Data

US 2020/0128658 A1    Apr. 23, 2020

Related U.S. Application Data

(60) Provisional application No. 62/747,974, filed on Oct. 19, 2018.

(51) Int. Cl.
| | | |
|---|---|---|
| *H01J 37/00* | (2006.01) | |
| *H05H 1/16* | (2006.01) | |
| *H05H 1/54* | (2006.01) | |
| *H05H 1/22* | (2006.01) | |

(52) U.S. Cl.
CPC ............... *H05H 1/16* (2013.01); *H05H 1/54* (2013.01); *H05H 1/22* (2013.01)

(58) Field of Classification Search
CPC ............... H01J 137/147; H01J 137/244; H01J 137/3171; H01J 37/147; H01J 37/244; H01J 37/3171; H05H 1/16; H05H 1/22; H05H 1/54; H05H 5/03; H05H 5/08
USPC ........................................... 315/500, 111.21
See application file for complete search history.

(56) References Cited

U.S. PATENT DOCUMENTS

| | | | |
|---|---|---|---|
| 3,859,164 A | | 1/1975 | Nowak |
| 4,434,130 A | | 2/1984 | Salisbury |
| 5,302,881 A | * | 4/1994 | O'Loughlin ............ H01J 23/04 313/346 R |
| 5,744,919 A | * | 4/1998 | Mishin .................... H05H 9/00 315/500 |
| 6,433,494 B1 | * | 8/2002 | Kulish .................... H05H 1/54 250/251 |
| 6,653,637 B2 | | 11/2003 | Ochiai |
| 6,781,117 B1 | | 8/2004 | Willoughby et al. |
| 2003/0223528 A1 | | 12/2003 | Miley et al. |
| 2007/0201598 A1 | | 8/2007 | Lerner et al. |
| 2007/0221862 A1 | | 9/2007 | Suits et al. |
| 2007/0252089 A1 | * | 11/2007 | Gorrell ................. G21K 1/087 250/399 |
| 2011/0017907 A1 | | 1/2011 | Makarov et al. |
| 2011/0071764 A1 | | 3/2011 | Prather et al. |
| 2011/0155901 A1 | | 6/2011 | Vestal |
| 2015/0380228 A1 | | 12/2015 | Schanen |

(Continued)

OTHER PUBLICATIONS

International Search Report and Written Opinion dated Jan. 2, 2020 in International Application No. PCT/US2019/055035. 12 pages.

(Continued)

*Primary Examiner* — Tung X Le
(74) *Attorney, Agent, or Firm* — Kilpatrick Townsend & Stockton LLP

(57) ABSTRACT

Described are systems and methods for compressing a plasma through electric and magnetic interactions between groups of positively charged particles and negatively charged particles of the plasma.

20 Claims, 11 Drawing Sheets

(56) References Cited

U.S. PATENT DOCUMENTS

2017/0110282 A1* 4/2017 White ................... H01J 27/14
2020/0035452 A1* 1/2020 Bennahmias ........... H01J 37/04

OTHER PUBLICATIONS

Evans, L.R.; "Beam effects in hadron colliders"; 1985; American Institute of Physics Conference Proceedings; Mar. 5, 1985; vol. 127, Issue 1; pp. 243-293.
Beynon, T.D.; "The Physics of Ion Beam Fusion"; Nuclear Instruments and Methods in Physics Research Section B: Beam Interactions with Materials and Atoms; vol. 9, Issue 4, Jul. 1985; pp. 767-771.
Bangerter, Roger O.; "Ion beam fusion"; Philosophical Transactions of the Royal Society of London: Series A; Mar. 15, 1999; vol. 357, Issue 1752; pp. 575-593.

* cited by examiner

METHODS AND SYSTEMS FOR PLASMA SELF-COMPRESSION

CROSS-REFERENCE TO RELATED APPLICATIONS

This application claims the benefit of and priority to U.S. Provisional Application No. 62/747,974, filed on Oct. 19, 2018, which is hereby incorporated by reference in its entirety.

BACKGROUND

It can be challenging to concentrate charged particles in a vacuum, due to the repulsive electrical forces between particles having the same charge sign. Over time, the repulsive forces between charged particles in a group having the same charge sign will lead to charge separation and decreased charge density. Increasing and maintaining charge density is useful for many technologies, including fusion, ion and electron sources, and experimental physics research.

BRIEF SUMMARY

Described herein are methods, systems, and apparatuses for compressing plasmas, such as plasmas comprising negatively and positive charged particles, such as electrons and one or more positive or negative ions. By compressing plasmas, the groups of charged particles of different signs within the plasma can be brought closer together, providing the ability to generate extremely dense groups of charged particles.

In one aspect, vacuum systems, plasma compression systems, and fusion trap systems are disclosed. For example, a system of this aspect may comprise a first particle source arranged to direct negatively charged particles along an axis; a second particle source arranged to direct positively charged particles along the axis; a first voltage element arranged along the axis for controlling a first axial velocity of negatively charged particles from the first particle source; and a second voltage element arranged along the axis for controlling a second axial velocity of positively charged particles from the second particle source.

It will be appreciated that the term voltage element as used herein may refer to multiple individual voltage elements operating together for a common function, such as to accelerate a group of charged particles, to decelerate a group of charged particles, as one end of a charged particle trap, to focus or shape a group of charged particles, or the like. As an example, in some embodiments, the first voltage element corresponds to a first pair of voltage elements. Optionally, the second voltage element corresponds to a second pair of voltage elements. In some embodiments, the interaction region is positioned between the first pair of voltage elements and between the second pair of voltage elements. Example voltage elements include ring electrodes. Multiple ring electrodes, for example, may be used to form a charged particle acceleration lens, a charged particle deceleration lens, a charged particle focusing or Einzel lens, or a charged particle shaping lens Control circuitry may also be included in the systems of this aspect. For example, the control circuitry may be configured to control potentials applied to the first voltage element to direct a first group of negatively charged particles along the axis, such as a first group of negatively charged particles that extends radially from the axis and is characterized by a first radial distribution, to control potentials applied to the second voltage element to direct a second group of positively charged particles along the axis, such as a second group of positively charged particles that extends radially from the axis and is characterized by a second radial distribution, and to control potentials applied to the first voltage element and the second voltage element to control the first axial velocity of the first group of negatively charged particles and the second axial velocity of the second group of positively charged particles and simultaneously position the first group of negatively charged particles and the second group of positively charged particles in an interaction region while the first group of negatively charged particles and the second group of positively charged particles are moving in opposite directions. In embodiments, interactions between the first group of negatively charged particles and the second group of positively charged particles in the interaction region may result in narrowing one or both of the first radial distribution or the second radial distribution. Narrowing of the radial distribution of a charged particle group may optionally be referred to herein as compression, plasma compression, or plasma self-compression. In some cases, controlling potentials applied to a voltage element may be referred to herein as controlling the voltage element.

The above description may correspond to a single interaction of groups of charged particles. However, multiple repeated interactions may occur, such as by oscillating the groups of charged particles between voltage elements. In some embodiments, the control circuitry is further configured to control the first voltage element and the second voltage element to control the first axial velocity of the first group of negatively charged particles and the second axial velocity of the second group of positively charged particles to redirect the first group of negatively charged particles and the second group of positively charged particles and simultaneously re-position the first group of negatively charged particles and the second group of positively charged particles in the interaction region an additional time while the first group of negatively charged particles and the second group of positively charged particles are moving in opposite directions. In some embodiments, further interactions between the first group of negatively charged particles and the second group of positively charged particles in the interaction region result in further narrowing of one or both of the first radial distribution or the second radial distribution.

Various charged particle configurations for the disclosed systems may be employed. For example, in some embodiments, the first group of negatively charged particles comprises an electron beam or an electron bunch. Optionally, the second group of positively charged particles comprises a positive ion beam or a positive ion bunch. In some embodiments, the second group of positively charged particles comprises two or more different positive ion species. Optionally, multiple separate groups of charged particles may be used, such as multiple positive ion groups, multiple negative ion groups, or multiple electron groups. Optionally, charged particles may be generated via a plasmoid. Stated another way, plasmoids may be used as positively charged particle sources, negatively charged particle sources, or both in any of the systems described herein.

Various geometrical arrangements of elements of the disclosed systems may be implemented. For example, in some embodiments, the axis is linear. The voltage elements may optionally be distributed linearly along the axis. Optionally at least a portion of the axis is curved. Use of curved axes may be useful for implementing vacuum systems, plasma compression systems, or fusion trap systems with a ring configuration. For example, a system of this aspect may further comprise one or more charged particle deflectors arranged to deflect the first group of negatively charged particles and the second group of positively charged particles so that the axis corresponds to a ring configuration.

In operation, systems of this aspect may employ any suitable number and identity of charged particles. In some embodiments, the interaction region includes equal numbers of negatively charged particles and positively charged particles, such as when the first group of negatively charged particles and the second group of positively charged particles are simultaneously positioned in the interaction region. Use of the equal numbers of positively and negatively charged particles may be useful for reducing or eliminating charged particle group self-expansion due to electric field effects between different particles in the charged particle group. As explained in further detail below, when equal numbers of positively and negatively charged particles are simultaneously present in the same region in space, space charge effects between the charged particles may tend to cancel, minimizing self-expansion of overlapped groups of positively and negatively charged particles.

The interaction region where charged particles from different groups come into close contact with one another may have any desirable configuration. For example, the first group of negatively charged particles may be characterized by a first volume, while the second group of positively charged particles may be characterized by a second volume. The interaction region may optionally correspond to a region where the first volume and the second volume overlap. In some embodiments, voltage elements or vacuum chamber walls, for example, may establish a field free region within the system, such as at an interaction region. In a specific embodiment, the first voltage element and the second voltage element establish a field free region at the interaction region.

Charged particle traps may be used with the systems of this aspect to build up numbers of charged particles in a group. Optionally, a system of this aspect further comprises a first charged particle trap positioned to receive negatively charged particles from the first particle source. Optionally, a system of this aspect further comprises a second charged particle trap positioned to receive positively charged particles from the second particle source. Example charged particle traps may include a plurality of voltage elements spatially separated from one another, with applied potentials (i.e., voltages) controlled to induce the charged particles to stay between the voltage elements for some time duration. By adding additional charged particles to a charged particle trap, groups of large numbers of charged particles can be generated.

In some embodiments, voltage elements may be operated as charged particle electrostatic mirrors. When pair of voltage elements are operated as a pair of charged particle electrostatic mirrors and are spatially separated from one another, the voltage elements may function to trap charged particles in the space between them, with the particles oscillating from side to side between the pair of electrostatic mirrors. Optionally, the first voltage element corresponds to a first pair of voltage elements, while the second voltage element corresponds to a second pair of voltage elements, with the control circuitry further configured to control potentials applied to the first pair of voltage elements and the second pair of voltage elements to control the first axial velocity of the first group of negatively charged particles and the second axial velocity of the second group of positively charged particles to oscillate the first group of negatively charged particles between the first pair of voltage elements and to oscillate the second group of positively charged particles between the second pair of voltage elements in order to repeatedly position the first group of negatively charged particles and the second group of positively charged particles in the interaction region simultaneously while the first group of negatively charged particles and the second group of positively charged particles are moving in opposite directions. Such a configuration may advantageously allow multiple interactions between the charged particle groups and, thus, multiple opportunities for plasma self-compression to concentrate the charged particle groups, to increase a particle group volumetric density, and/or to decrease a charged particle group spatial or radial distribution.

As noted above, multiple different groups of charged particles may be included in the disclosed systems. For example, a system of this aspect may further comprise a third particle source arranged to direct positively charged particles along the axis, wherein the second voltage element (or an additional voltage element) is further arranged for controlling a third axial velocity of positively charged particles from the third particle source, such as a third group of positively charged particles that extends radially from the axis and is characterized by a third radial distribution. Optionally, the second particle source and the third particle source are the same. Optionally, the control circuitry may be configured to or further configured to control the first voltage element and the second voltage element to control the first axial velocity of the first group of negatively charged particles, the second axial velocity of the second group of positively charged particles, and a third axial velocity of the third group of positively charged particles and simultaneously position the first group of negatively charged particles, the second group of positively charged particles, and the third group of positively charged particles in the interaction region while the first group of negatively charged particles moves in an opposite direction to the second group of positively charged particles and the third group of positively charged particles. In such a configuration, interactions between the first group of negatively charged particles, the second group of positively charged particles, and the third group of positively charged particles in the interaction region can result in narrowing of one or more of the first radial distribution, the second radial distribution, or the third radial distribution. The use of three groups of charged particles may, for example, facilitate use of the system as a fusion system.

Optionally, the control circuitry may be configured to control one or both of the second axial velocity or the third axial velocity to increase a relative velocity between the second group of positively charged particles and the third group of positively charged particles. Having a relative velocity between different groups of positively charged particles may allow for individual charged particles from the different groups to collide with one another and undergo fusion. Optionally, a system of this aspect may further comprise a direct energy converter, such as a direct energy converter configured to collect charged fusion products from fusion reactions between positively charged particles of the second group of positively charged particles and the third group of positively charged particles and to convert energy, such as kinetic energy, from collected charged fusion products to electrical energy.

Various direct energy converters may be useful with the systems described herein. For example, a direct energy converter optionally comprises a collection grid surrounding the interaction region. Optionally, the system may further comprise one or more capacitors arranged in electrical communication with the direct energy converter for storing the electrical energy. Other direct energy converters may include elements that receive or collect fusion products and convert energy contained in the fusion products to heat. The heat may be used to directly generate electricity or to generate electricity via one or more intermediate systems, such as a steam turbine.

It will be appreciated that systems of this aspect may optionally include additional or fewer components in addition to those described herein.

In another aspect, methods for concentrating charged particles are described herein. Methods of this aspect may be performed by the systems disclosed herein, or other systems. Methods for concentrating charged particles may correspond to processes for inducing plasma compression or plasma self-compression, for example. Methods for concentrating charged particles may be useful, for example, in fusion trap systems and other fusion systems.

An example method of this aspect comprises directing a first group of negatively charged particles along an axis, such as a first group of negatively charged particles that extends radially from the axis and is characterized by a first radial distribution; directing a second group of positively charged particles along the axis, such as a second group of positively charged particles that extends radially from the axis and is characterized by a second radial distribution; and controlling a first axial velocity of the first group of negatively charged particles and a second axial velocity of the second group of positively charged particles to simultaneously position the first group of negatively charged particles and the second group of positively charged particles in an interaction region while the first group of negatively charged particles and the second group of positively charged particles are moving in opposite directions. In embodiments, interactions between the first group of negatively charged particles and the second group of positively charged particles in the interaction region result in narrowing of one or both of the first radial distribution or the second radial distribution. Such a narrowing of radial distributions, as described in more detail below, may be referred to herein as self-compression or plasma self-compression, as such occurs when positively and negatively charged particles overlap with one another while traveling in opposite directions. In some embodiments, the first group of negatively charged particles comprises an electron beam or an electron bunch. Optionally, the second group of positively charged particles comprises a positive ion beam or a positive ion bunch. Optionally, the second group of positively charged particles comprises two or more different positive ion species.

Optionally, methods of this aspect may further comprise controlling the first axial velocity of the first group of negatively charged particles and the second axial velocity of the second group of positively charged particles to redirect the first group of negatively charged particles and the second group of positively charged particles and simultaneously re-position the first group of negatively charged particles and the second group of positively charged particles in the interaction region an additional time while the first group of negatively charged particles and the second group of positively charged particles are moving in opposite directions. Further interactions between the first group of negatively charged particles and the second group of positively charged particles in the interaction region may result in further narrowing of one or both of the first radial distribution or the second radial distribution. In this way, repeated interactions between groups of positively charged particles and negatively charged particles may establish repeated self-compression and generate tightly concentrated groups of charged particles.

Various geometrical configurations may be employed with the methods described herein. For example, in some embodiments, the axis may be a linear axis. Optionally, at least a portion of the axis may be curved. Optionally a method of this aspect may further comprise deflecting the first group of negatively charged particles and the second group of positively charged particles so that the axis corresponds to a ring configuration. Linear and ring configurations are described in further detail herein.

Optionally, the methods of this aspect include overlapping equal numbers of negatively charged particles and positively charged particles in the interaction region. Such a configuration may advantageously result in minimizing or cancelation of electrostatic particle-particle interactions that may tend to spread the individual charged particle groups. Optionally, the interaction region includes equal numbers of negatively charged particles and positively charged particles when the first group of negatively charged particles and the second group of positively charged particles are simultaneously positioned in the interaction region. In some examples, the interaction region corresponds to a region where a first volume, characteristic of the first group of negatively charged particles, and a second volume, characteristic of the second group of positively charged particles, overlap.

As described above and herein with respect to the disclosed systems, voltage elements may be used to control velocities and positions of charged particles in the methods of this aspect. For example, a first voltage element may be configured to control the first axial velocity of the first group of negatively charged particles. Optionally, a second voltage element is configured to control the second axial velocity of the second group of positively charged particles. Optionally, a method of this aspect may further comprise establishing a field free region between the first voltage element and the second voltage element.

As described above and herein with respect to the disclosed systems, particle sources may be used to generate charged particles. Additionally, charged particle traps may be used to store and/or build up numbers of charged particles for use in the methods of this aspect. For example, in some embodiments, a method of this aspect comprises or further comprises generating the first group of negatively charged particles using a first particle source. Optionally a method of this aspect comprises or further comprise storing the first group of negatively charged particles in a first charged particle trap. Optionally, directing the first group of negatively charged particles may include accelerating the first group of negatively charged particles out of the first charged particle trap in a first direction. Optionally, a method of this aspect comprises or further comprises generating the second group of positively charged particles using a second particle source. Optionally, a method of this aspect comprises or further comprises storing the second group of positively charged particles in a second charged particle trap. Optionally, directing the second group of positively charged particles includes accelerating the second group of positively charged particles out of the second charged particle trap in a second direction.

In some embodiments, the groups of charged particles may be oscillated back and forth, such as between voltage elements operating as electrostatic mirror elements, to allow repeated interactions between different groups of charged particles traveling in opposite directions. For example, directing the first group of negatively charged particles optionally includes oscillating the first group of negatively charged particles between a first pair of voltage elements arranged along the axis. Optionally, directing the second group of positively charged particles includes oscillating the second group of positively charged particles between a second pair of voltage elements arranged along the axis. Such a configuration may optionally be useful for the first group of negatively charged particles and the second group of positively charged particles to be repeatedly simultaneously positioned in the interaction region while the first group of negatively charged particles and the second group of positively charged particles are moving in opposite directions. In this way, multiple instances of self-compression may occur, resulting in tightly concentrated groups of charged particles.

Methods of this aspect may also be useful for generating, facilitating, or enabling fusion reactions between charged particles. For example, a method of this aspect may further comprise directing a third group of positively charged particles in a third direction along the axis, such as a third group of positively charged particles that extends radially from the axis and is characterized by a third radial distribution. In embodiments, the method may control the first axial velocity of the first group of negatively charged particles, the second axial velocity of the second group of positively charged particles, and a third axial velocity of the third group of positively charged particles to simultaneously position the first group of negatively charged particles, the second group of positively charged particles, and the third group of positively charged particles in the interaction region while the first group of negatively charged particles moves in an opposite direction to the second group of positively charged particles and the third group of positively charge particles. Interactions between the first group of negatively charged particles, the second group of positively charged particles, and the third group of positively charged particles in the interaction region may result in narrowing of one or more of the first radial distribution, the second radial distribution, or the third radial distribution.

Due to the relative velocity between the different groups of positively charged particles, individual positively charged particles from one group may collide with individual positive charged particles from the other group and undergo fusion. Optionally, a method of this aspect may include controlling one or both of the second axial velocity or the third axial velocity to increase a relative velocity between the second group of positively charged particles and the third group of positively charged particles and collecting charged fusion products from fusion reactions between positively charged particles of the second group of positively charged particles and the third group of positively charged particles. Kinetic energy from collected charged fusion products may advantageously be converted to electrical energy and optionally stored in one or more capacitors or other charge storage devices.

A better understanding of the nature and advantages of embodiments of the present invention may be gained with reference to the following detailed description and the accompanying drawings.

DEFINITIONS

Figure 1:
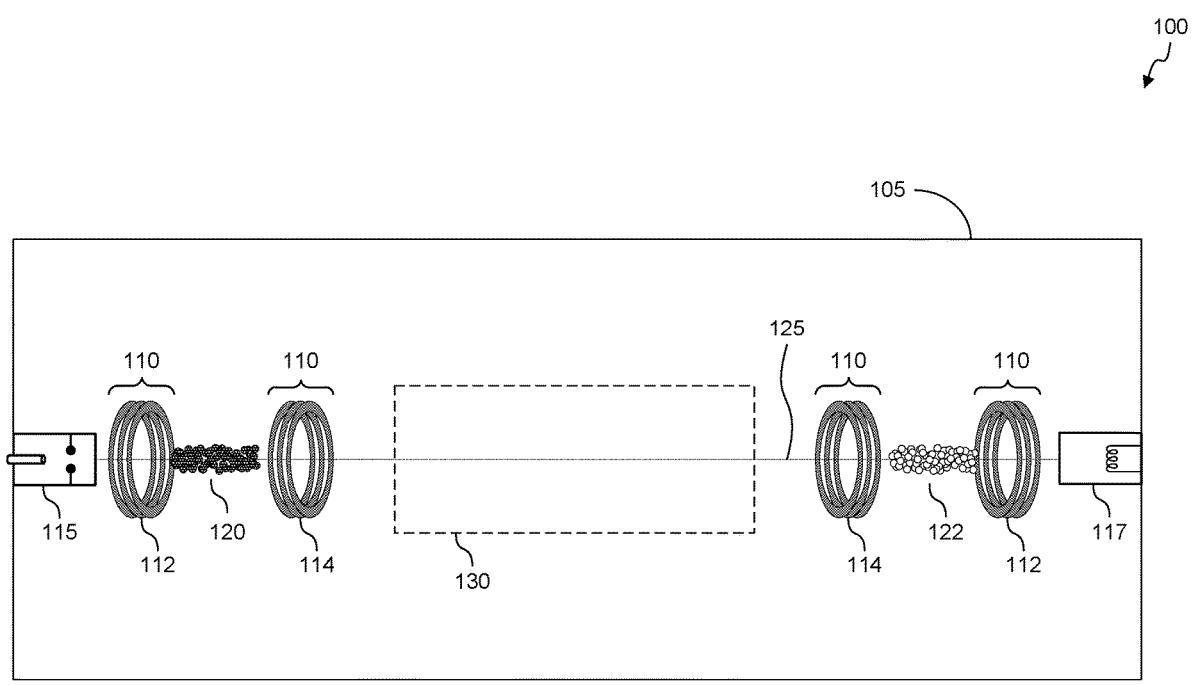
FIG. 1 provides a schematic illustration of an example vacuum system, including voltage elements and particle sources.

In general the terms and phrases used herein have their art-recognized meaning, which can be found by reference to standard texts, journal references and contexts known to those skilled in the art. The following definitions are provided to clarify their specific use in the context of the invention.

"Particle source" refers to a device or component that can generate charged particles. A particle source may be a negatively charged particle source or a positively charged particle source. Particle sources may employ emissive devices or ionization devices, which may use voltages or currents applied to one or more electrodes to separate electrons from a material. In some cases, electrons are separated from a gas in an impact ionization scheme in which electrons are directed at gas atoms or molecules and remove electrons from the gas atoms or molecules through electron impact to generate positively charged ions. In some cases, electrons are emitted directly from an emissive element, such as a thermionic emitter, which may emit electrons when heated. Particle sources may include electrodes for accelerating the generated charged particles.

"Negatively charged particle" refers to an atomic, subatomic, or molecular species having a negative charge, which may be due to the number of electrons in the particle being greater than the number of protons. Negatively charged particles include molecular and atomic anion species, as well as individual electrons.

"Positively charged particle" refers to an atomic, subatomic, or molecular species having a positive charge, which may be due to the number of protons in the particle being greater than the number of electrons. Positively charged particles include molecular and atomic cation species, as well as individual protons or hydrogen nuclei.

"Voltage element" refers to a conductive device that can be held at any desired potential by application of a voltage to the device. Voltage elements may include electrodes, such as a ring electrode or a plate electrode. Voltage elements may have any suitable shape, including a ring or annulus, a cylinder, a plate, or a rectangular cuboid. In some cases, a voltage element may include multiple individual components, such as multiple electrode elements or sub-elements. For example, an Einzel lens is a voltage element made up of a plurality of individual electrodes held at controlled voltages and used to focus charged particles that pass through the electrodes.

"Axial velocity" refers to the speed at which an object traverses along an axis. In some cases, an axial velocity refers to the magnitude of a component of a velocity vector that is parallel to an axis. In some cases, an axial velocity refers to an average or ensemble velocity of a group of objects travelling along an axis.

"Control circuitry" refers to one or more electrical components interconnected to allow or provide for the ability to change an electrical characteristic as an output and that may optionally receive inputs identifying how the electrical characteristics may be changed. Control circuitry may provide for the ability to change or adjust an output electrical characteristic as a function of time. In some cases, control circuitry may include a processor or integrated circuit for executing instructions that may establish what the outputs should be as a function of time. Control circuitry may employ inputs, such as sensor inputs or user inputs, to provide for adjustment of the output electrical characteristics. Example output electrical characteristics may include AC and DC voltages, AC and DC currents, switching signals, and the like.

"Charged particle group" or "group of charged particles" refers to a plurality of one or more charged particles. A charged particle group may include particles that are arranged in proximity to one another and that travel together at a common velocity. A charged particle group generally refers to particles having the same charge sign (i.e., positive or negative). For example, a charged particle group may be a group of negatively charged particles or a group of positively charged particles. In some cases, a charged particle group may be a plasma. Charged particle groups include beams of charged particles or bunches of charged particles. A "beam of charged particles" or "charged particle beam" may refer to a longitudinally extended distribution of charged particles, which may be continuously streaming from a particle source. A "bunch of charged particles" or "charged particle bunch" may refer to a discrete group of charged particles, which may also be referred to as a packet, bunch, beamlet, or other terms indicating that the group of particles is not continuous. In embodiments, a group of charged particles may travel as an ensemble along an axis and may have positions that are located at a non-zero distance from the axis, meaning that the group of particles may be axially centered along the axis but individual particles may not necessarily all lie exactly on the axis but may instead be displaced from the axis.

A "radial distribution" refers to a description of the distances at which objects are positioned around a point or axis. A radial distribution may reflect statistical positions of the objects. A radial distribution may be centered on the reference point or axis or may be displaced from the point or axis, depending on the positions of the objects described by the distribution. Narrowing of a radial distribution may refer a change in the radial distribution describing that the objects characterized by the distribution have become closer together or spread less. In terms of a Gaussian distribution, a narrower Gaussian distribution has a smaller standard deviation. For example, a radial distribution of a charged particle group may describe the statistical positions of the charged particles in the group relative to an axis. In some embodiments, a radial distribution of a charged particle group may be described or characterized by a Gaussian distribution. A radial distribution of a group of particles that is narrowed may refer to the Gaussian distribution characterizing the positions of the particles with respect to an axis changing to have a smaller standard deviation. Narrowing of a radial distribution of a charged particle group may also be characterized by or indicate that the particle group's charge or number density is increasing.

"Overlap" of charged particle groups and charged particle groups that are "simultaneously positioned" at the same location refers to distinct groups of charged particles occupying a common region of space, such that the particles may be considered as intermixed. It will be appreciated that two particles cannot occupy the same exact position, so an overlap of two or more groups of particles may refer to the groups having the same central positions or central positions that are co-located within the extent of the other groups of particles. In some embodiments, a charged particle group may be characterized by a volume, such as a volume that describes the maximum extent of particles in the group, such as the smallest cylindrical volume that captures all particles in the group. Overlapping charged particle groups or charged particle groups that are simultaneously positioned at the same location may indicate that the characteristic volumes of two or more particle groups are at least partially overlapping in space.

"Interaction region" refers to a portion of a vacuum system, plasma compression system, or fusion trap in which charged particle groups can overlap. In some embodiments, an interaction region may refer to a space at which charged particle groups do overlap, have overlapped, or will overlap during operation of vacuum system, plasma compression system, or fusion trap. In some embodiments, an interaction region may be referred to as a field free region or drift region or may be configured to have a field free configuration, in which no intentional potentials are introduced to accelerate, decelerate, focus or deflect a charged particle group. A field free region may have a field strength provided by voltage elements adjacent to the interaction region that is zero, close to zero, or lower than a threshold value for which charged particle accelerations, decelerations, focusing effects, or deflections do not impact the trajectories of the charged particles. Electric and magnetic field interactions between charged particles in the field free region may exist, however. A field free region may be established in a vacuum system, plasma compression system, or fusion trap by positioning at least two voltage elements apart from one another in space and establishing a common electrical potential on each of the voltage elements. In some cases, a field free region is free of electrodes or voltage elements. In some cases, a field free region may include one or more electrodes or voltage elements that all have a common electrical potential, such as a potential that matches that of electrodes present at the edge of the field free region. In some cases, a field free region may be grounded (i.e., electrode potentials sent to 0 V or ground). Optionally, a field free region may be surrounded by a grounded element, such as a vacuum chamber wall. In some embodiments, a field free region may have a non-zero potential, but still exhibit a field free configuration due to the common non-zero electrical potentials at electrodes or voltage elements present in or around the field free region. It will be appreciated that stray fields may be present in a field free region, but that the region may still be considered field free provided that no intentional fields are applied by voltage elements adjacent to the field free region.

"Fusion" refers to the process by which two atomic nuclei join together to form one or more different atomic nuclei.

For example, fusion of two hydrogen nuclei may form a helium nucleus. Energy may be released from a fusion reaction in the form of photons and/or kinetic energy in the product particles. In some embodiments, energy released by fusion reaction may be captured and stored in an energy storage device. For example, kinetic energy of charged particles generated by a fusion reaction may be captured and stored in a capacitor. In some embodiments, a direct energy converter, such as a collection grid corresponding to one or more electrodes surrounding an interaction region, may be used to capture energy released by a fusion reaction.

DETAILED DESCRIPTION

Described are systems and methods for compressing a plasma through electric and magnetic interactions between groups of positively charged particles and negatively charged particles of the plasma. Groups of positively charged particles and negatively charged particles can be directed at one another (i.e., with opposite velocity directions) in a coaxial configuration (i.e., along a common axis), and when the groups overlap (i.e., are present in the same spatial volume such that the overall charge in the overlap region is zero or closer to zero than each of the groups individually), the groups may be exposed to forces that tend to direct the positively charged particles and negatively charged particles in the groups towards the common axis. Such forces may be termed herein as radially compressive forces and groups of positively charged particles and negatively charged particles subjected to such forces may be referred to as subjected to radial compression. Radial compression can be achieved in this way because the effective electric field that each particle is exposed to during overlap may be zero or very small (due to cancelation of positive and negative charges when overlapping resulting in an overall zero charge or charge closer to zero during overlap), while the effective magnetic field that each particle is exposed to during overlap may radially compress both the group(s) of positively charged particles and the group(s) of negatively charged particles. If the groups are allowed to repeatedly interact in this way, the compression of the groups can result in tightly compressed groups of high charged particle concentration. Examples of groups of charged particles may include packets or bunches of charged particles or beams of charged particles.

Instead of just directing a single group of positively charged particles towards a group of negatively charged particles, multiple groups of positively charged particles may be used. For example, two different groups of positively charged particles may be directed towards a group of negatively charged particles. Through the cancelation of charge at the common overlap of all the groups, the overall electric and magnetic forces can result in radial compression of each of the groups and an increase in the concentration or number density of the positively and negatively charged particles.

This configuration can be useful for beam-beam or bunch-bunch fusion. For example, when the two positively charged ion groups are traveling at different velocities (i.e., with a relative velocity between them) fusion between positively charged ions from one group and positively charged particles from the other group can occur. By concentrating (i.e., increasing a number density within) the groups of positively charged ions through the overlap of the positively charged ion groups with a negatively charged particle group, the probability that fusion will occur can be increased.

I. Particle Beams and Bunches

Charged particles, such as electrons and ions (e.g., hydrogen ions, helium ions, etc.), may be assembled into stable beams and bunches, for example, in a vacuum system. An example vacuum system 100, depicted in FIG. 1, includes a vacuum chamber 105. An example particle beam includes a beam of electrons that may be generated and focused or deflected using voltage elements 110, such as Einzel lenses, ring electrodes, or electrostatic deflectors. Similarly, a beam of ions may be generated and focused or deflected. In some cases, continuous particle beams may be generated, such as comprising a continuously flowing stream of particles that may be replenished by a particle source 115, 117. Optionally, particles may be assembled as a bunch or packet including a plurality of individual particles that are grouped into a finite volume. Charged particle beams and bunches, also referred to herein as groups of charged particles 120, 122 or charged particle groups 120, 122, may be subjected to various forces, such as magnetic and electric forces arising from magnetic and electric fields, for example. Charged particle groups 120, 122 may be directed along axis 125 by particle sources 115, 117 and may extend from axis 125 and/or be characterized by a radial distribution about axis 125. The radial distribution about axis 125 of charged particle groups 120, 122 may reflect a size of charged particle groups 120, 122, with smaller or narrower radial distributions corresponding to a tighter, smaller, or more highly compressed group of charged particles 120, 122. The radial distribution may also or alternatively correspond to a volume in space that the charged particle group 120, 122 may occupy or an extent of the volume in space that the charged particle group 120, 122 may be present in. For a fixed number of charged particles within a charged particle group 120, 122, the radial distribution may also relate to a number density of the charged particles, since the tighter the fixed number charged particles are grouped, the smaller the volume and the higher their number density.

Charged particle groups 120, 122 may be distinct over a plasma, in which both positively charged particles and negatively charged particles are present. When groups of positively charged particles 120 and negatively charged particles 122 are placed into the same physical volume in space, the groups may correspond to a plasma or exhibit properties similar to that of a plasma.

The groups of charged particles 120, 122 may be accelerated or decelerated within the vacuum system to control their motion (i.e., velocities and positions). In some cases, cylindrical ring electrodes may be used for controlling motion of the charged particle group 120, 122 along axis 125. In some embodiments, a charged particle group 120, 122 can be made to oscillate between voltage elements 110 operating as electrostatic mirrors. Oscillatory motion may be advantageous, for some embodiments, as the charged particles within the charged particle group 120, 122 may not be lost due to collision with the vacuum chamber's walls after a single pass through the central field free interaction region 130 and may exhibit longer useful lifetimes by way of multiple passes within the interaction region 130 between the electrostatic mirrors. The speed of the charged particle groups 120, 122 may be controlled by passing through a ring electrode held at a lower potential for the charged particles (e.g., larger positive voltage in the case of negatively charged particles and larger negative voltage in the case of positively charged particles). In this way, the speed of the particles can be controlled to any desired value.

Further details on electrostatic mirrors can be found in U.S. Pat. No. 6,744,042; D. Zajfman et al., "Electrostatic bottle for long-time storage of fast ion beams," Physical Review A, vol. 55, No. 3, p. R1577-R1580, (1997); Pedersen et al., "Ion Motion Synchronization in an Ion-Trap Resonator," Phys. Rev. Lett., pp. 055001-055004, 87 (2001); Pedersen et al., "Diffusion and synchronization in an ion-trap resonator," Physical Review A, Volume 65, p. 042704 (2002); Andersen et al., "Physics with electrostatic rings and traps," J. Phys. B: At. Mol. Opt. Phys. 37 (2004) R57-R88; and Attia et al., "Transverse kinematics of ions stored in an electrostatic ion beam trap," Nucl. Ins. and Methods in Physics Research A, 547, pp 279-286 (2005), all of which are hereby incorporated by reference in their entireties.

A. Particle Sources

Charged particles may be generated by a particle source 115, 117. Groups of both positively charged particles 120 and negatively charged particles 122 may be generated by various particle sources 115. An electron source 117, for example, may be used to generate free electrons (i.e., electrons not bound to an atom or molecule), which can be formed into electron beams or electron bunches. An example electron source 117 is a heated emitter, which may comprise a material that is heated to a temperature at which thermal energy given to the electrons is higher than the material's work function, allowing the electrons to escape from the material. Low work function materials, such as various metal oxides, refractory metals and alloys, and transition metal hexaborides, borides, and carbides may be useful materials for heated emitters. Heated emitters may be incorporated into an electron source 117 including one or more electrodes or voltage elements that can accelerate and focus the electrons.

Ion sources 115 may be more complex than electrons sources, since electrons can be simply emitted without needing a separate source of atomic material. In general, ion sources 115 may include a mass flow controller that directs a flow of ionizable gas into a vacuum chamber through a vacuum feedthrough. Near the end of the feedthrough, an electric discharge may be generated by providing a high voltage between two electrodes. The discharge may correspond to an electron arc, and the ionizable gas may be exposed to or passed through the arc, and the atoms within the gas may become ionized by means of electron impact ionization. One or more electrodes or voltage elements may be used to accelerate and focus the ions.

In some cases, depending on the configuration, high energy beams or bunches of electrons can be used for generating ions in place of a discharge or electron arc. For example, an ionizable gas may be passed through or into a path of an electron beam or electron bunch and collisions between the electron beam and the ionizable gas may result in electron impact ionization and formation of positively charged ions.

For generating beams of electrons or ions, particle sources 115, 117 can be operated in a continuous fashion. For generating bunches of electrons or ions, particle sources 115, 117 can optionally be operated in a pulsed or switched fashion. In some cases particle traps may be used to bunch charged particles, as discussed in more detail below, and can be used with continuous or pulsed particle sources.

B. Ion and Electron Traps

Particle traps, such as electron traps and ion traps, may be useful for generating bunches of charged particles and for building up numbers of charged particles in a volume to increase particle density, for example. In order to eliminate the losses associated with having to generate new charged particles all the time, ion and electrons traps can be beneficial. Ion and electron traps are used in mass spectrometry to study ions and other charged particles by trapping the ions or charged particles in a controlled environment for extended periods of time. Some embodiment make use of one or more sets of ion and electron traps consisting of subsets of electrodes that function as electrostatic mirrors for both ions and electrons. Electrostatic mirrors are sets of electrodes with voltages placed upon them in order to create designated electrostatic field gradients with which to accelerate, decelerate, and reaccelerate both the positively charged particles and negatively charged particles. By using properly designed ion and electron traps, once ions are created by ionization and electrons through emission, the ions and electrons can be accelerated, decelerated and reaccelerated indefinitely inside the ion and electron traps and their oscillation frequency maintained by computer control, for example. Once ionized/emitted, the ions/electrons can be accelerated by the electrostatic mirrors to desired velocities and/or kinetic energy levels for a target application. After each traversal along the length of a vacuum system housing the ion or electron trap, the ions' and electrons' kinetic energy can be recaptured and reimparted by reacceleration by the electrostatic mirrors. The result is a continuous oscillation of ions and electrons as trapped charges across the length of the vacuum system. Since the ions and electrons remain trapped and oscillating between the mirrors, there is reduced loss of ions and electrons allowing multiple interactions between oscillating ions and electrons or between different oscillating ions. Thus, the use of the ion and electron traps can allow for and/or maximize the retention of the ionization and emission energy, the kinetic energy imparted, and the ions and electrons themselves.

In embodiments, a particle trap may comprise, for example, multiple voltage elements 110 (e.g., electrodes) arranged to receive charged particles from a particle source 115, 117. The voltage elements 110 may have their potentials independently changed in a dynamic fashion in order to create a potential well that allows collection of charged particles. The trapped particles may undergo oscillatory motion within the trap. A simple example of a particle trap may comprise a pair of voltage elements 110 operated as electrostatic mirrors. For example, a beam of charged particles 120, 122 may be directed through a series of one or more input ring electrode elements 112 along an axis and toward a series of one or more additional ring electrode elements 114 held at a potential sufficient for the operation as an electrostatic mirror to reflect the charged particles 120, 122. The potentials of the input ring electrode elements 112 may be changed to allow the charged particles reflected by the additional to be again reflected the input ring electrode elements 112 and trap the charged particles between the input ring electrode elements 112 and the additional ring electrode elements 114. Additional charged particles can be admitted into the trap by lowering the potential of the input ring electrode elements according to a carefully controlled timing configuration. Ring electrode elements within the ion trap can optionally be controlled as a function of time to form the oscillating particles into tighter bunches. Other ion trap configurations are contemplated, including quadrupole ion traps and multipole ion traps.

C. Ion and Electron Injection

Various injection techniques may be used to direct charged particles 120, 122 within vacuum system 100 so that the particles can interact. As described above, particle sources 115, 117 can be placed within the vacuum system 100 at a point along the voltage elements 110 where the particles would naturally be decelerated (come to a stop) and reaccelerated (accelerated toward the other side of the vacuum system) when the voltage element 110 is operated as an electrostatic mirror. By controlling timing of acceleration by voltage elements 110 in tandem with generation of charged particles 120, 122 by particle sources 115, 117, ions and electrons can be directed towards one another in an interaction region 130.

Another injection method involves the use of charged particle traps as injectors. The charged particle groups 120, 122 generated by particles sources 115, 117 may be trapped between ring electrode elements 112 and 114, as described above. Ring electrodes 114 may operate as gates to allow admission of charged particle groups 120, 122 to a region between the particle sources 115, 117 where the charged particle groups 120, 122 can interact.

Interaction region 130 may correspond to a drift region within vacuum system 100 where the charged particle groups 120, 122 can move freely in space without influence or with minimal or reduced influence from voltage elements 110, such as where an electric field strength generated by voltage elements 110 is low enough to avoid decelerating, or accelerating the charged particle groups 120, 122 to any significant extent (e.g., less than 1% change in velocity). Interaction region 130 may not correspond to any physically distinct or separate space and is depicted in FIG. 1 by a dashed line to identify the general region within vacuum system 100 where the interaction region 130 may lie. In some embodiments, interaction region 130 may correspond to positions within the vacuum system 100 where different charged particle groups 120, 122 can intersect, overlap, or come into close separation from one another. It will be appreciated that multiple interaction regions 130 may be present in the vacuum system 100. Further, it will be understood that the configuration depicted in FIG. 1 is merely an example and that other configurations may be used, such as where any suitable or desired number of field free or interaction regions 130, voltage elements 110, ion or electron traps, and ion or electron sources may be included in vacuum system 100.

II. Plasma Compression

Figure 2:
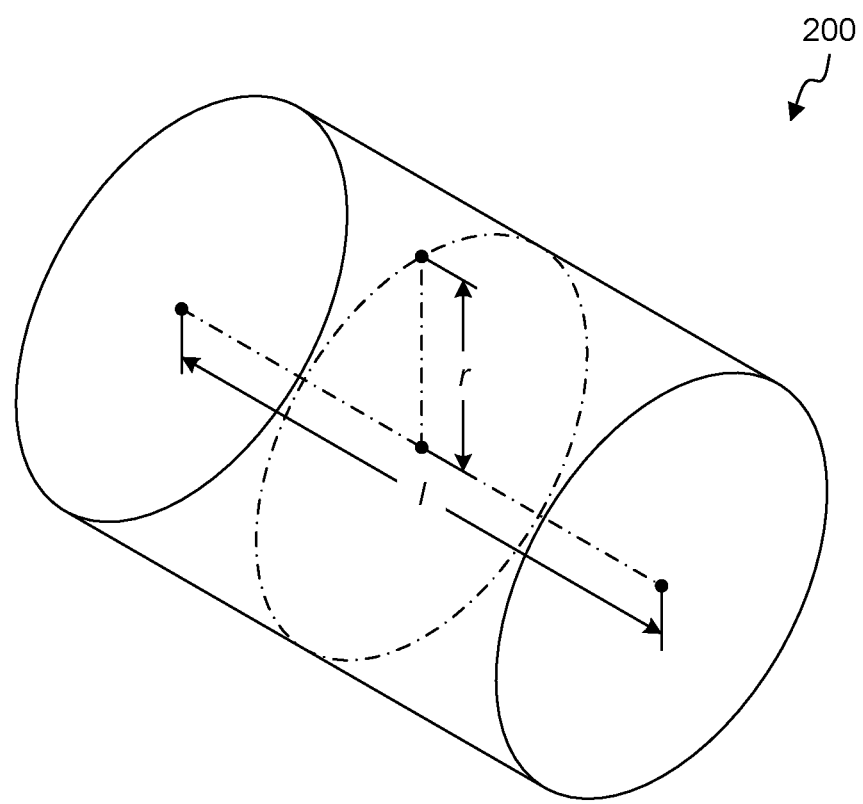
FIG. 2 provides a schematic illustration of a model of a charged particle group.

In a charged particle group, each individual particle may experience electric and magnetic forces due to other particles in the group. For example, in a group of protons, each proton may experience electric forces arising from all other protons in the group. FIG. 2 provides a schematic illustration of a simple model of a charged particle group 200. The charged particle group 200 may correspond to a bunch or beam of electrons, a bunch or beam of negative ions, or a bunch or beam of positive ions, for example. The cylinder in the figure represents the spatial extent of the charged particle group 200 and the density throughout the cylinder may be considered uniform in this model. In charged particle group 200, r denotes the radius and l denotes the length.

A. Electric Field Effects

The electric field, as a function of radius, that a given ion or electron in the charged particle group 200 may experience can be solved for using one of Maxwell's equations, Gauss's law and the divergence theorem.

$$\nabla \cdot E = \frac{\rho}{\epsilon_0}$$

$$\oiint_S E \cdot dA \iiint_V \nabla \cdot E dV = \iiint_V \frac{\rho}{\epsilon_0} dV$$

$$\oiint_S E \cdot dA = E 2\pi r l$$

-continued $$\iiint_V \frac{\rho}{\epsilon_0} dV = \frac{\rho}{\epsilon_0} \pi r^2 l$$

$$E 2\pi r l = \frac{\rho}{\epsilon_0} \pi r^2 l$$

$$E = \frac{\rho r}{2\epsilon_0}$$

Here, the electric field is E, the charged particle density is $\rho$, and $\epsilon_0$ is the permittivity of free space. In the equations, the terms for length cancel and the dominant variables for the electric field become the density and the radius within the charged particle group 200 at which the electric field is evaluated.

B. Magnetic Field Effects

The magnetic field within charged particle group 200 may similarly be determined using one of Maxwell's equations and Stokes' theorem.

$$\nabla \times B = \mu_0 J$$

$$\oint B \cdot dl = \iint \mu_0 J \cdot dS$$

$$\oint B \cdot dl = B 2\pi r$$

$$\iint \mu_0 J \cdot dS = \mu_0 J \pi r^2 = \mu_0 v \frac{\rho}{\epsilon_0} \pi r^2$$

$$B 2\pi r = \mu_0 v \rho \pi r^2$$

$$B = \frac{\mu_0 v \rho r}{2}$$

Here, the magnetic field is B, the particle or charge density is $\rho$, $\epsilon_0$ is the permittivity of free space, $\mu_0$ is the permeability of free space, and v is velocity. Based on these equations, the magnetic field that results is a function of the velocity, the radius, and the density. In this instance, there are no length terms to cancel since the length is inconsequential to the magnetic field produced by the group.

C. Ion Beam Interactions

When two or more charged particle groups (CP) are present, electric and magnetic effects may exist between particles within a group and between particles within different groups. When the charged particle groups are in superposition and physically overlapping one another in space, the resultant electric field is additive.

$$E_{Combined} = \frac{\rho_{CP1} r}{2\epsilon_0} + \frac{\rho_{CP2} r}{2\epsilon_0} + \frac{\rho_{CP3} r}{2\epsilon_0} \ldots$$

For positively charged particles, $\rho$ will have a positive value; for negatively charged particles, $\rho$ will have a negative value. From this equation, if the different $\rho$ values are carefully selected, the combined electric field can be zero, which may be equivalent to the space charge from each charged particle group being neutralized by the other charged particle groups.

For example, in the case of one positively charged particle group (e.g., a positive ion group) and one negatively charged particle group (e.g., an electron group), if the charge density for the positive ion group is set to +n and the charge density for the electron group is set to −n (i.e., the total numbers of electrons and positive ions are the same), the resultant electric field is $$E_{Combined} = \frac{\rho_{CP1}r}{2\epsilon_0} + \frac{\rho_{CP2}r}{2\epsilon_0}$$

$$E_{Combined} = \frac{(n)r}{2\epsilon_0} + \frac{(-n)r}{2\epsilon_0}$$

$$E_{Combined} = \frac{nr}{2\epsilon_0} - \frac{nr}{2\epsilon_0}$$

$$E_{combined} = 0$$

Similarly, in the case of two positively charged ion beams (IBs) (e.g., two positive ion groups) and one negatively charged electron beam (EB) (e.g., an electron group), if the charge density for each positive ion beam is set to +n and the charge density for the electron beam is set to −2n (i.e., the total numbers of electrons and positive ions are the same), the resultant electric field is $$E_{Combined} = \frac{\rho_{IB1}r}{2\epsilon_0} + \frac{\rho_{IB2}r}{2\epsilon_0} + \frac{\rho_{EB}r}{2\epsilon_0}$$

$$E_{Combined} = \frac{(n)r}{2\epsilon_0} + \frac{(n)r}{2\epsilon_0} + \frac{(-2n)r}{2\epsilon_0}$$

$$E_{Combined} = \frac{2nr}{2\epsilon_0} - \frac{2nr}{2\epsilon_0}$$

$$E_{combined} = 0$$

The combined electric field can be substituted into the Lorentz force equation to determine the force due to electric fields acting upon an ion or electron anywhere in the overlapping charged particle groups. Ignoring the magnetic forces, the resultant electric force upon a given charged particle having a charge +q (positive ion) or −q (electron) is $F_{Electric} = qE$ or $$F_{Electric(Ion)} = +qE_{Combined} = +q(0) = 0$$

$$F_{Electric(Electron)} = -qE_{Combined} = -q(0) = 0$$

Accordingly, within the combined groups with equal numbers of negatively charged particles and positively charged particles, there are no electric forces acting on any of the charged particles. This results eliminates a radially outward electric force that normally tends to spread the electrons or ions in a single charged particle group.

When the charged particle groups are in superposition and physically overlapping one another in space, the resultant magnetic field is also additive.

$$B_{Combined} = \frac{\mu_0 v_{CP1} \rho_{CP1} r}{2} + \frac{\mu_0 v_{CP2} \rho_{CP2} r}{2} + \frac{\mu_0 v_{CP3} \rho_{CP3} r}{2} \ldots$$

For positively charged particles, ρ will again have a positive value; for negatively charged particles, ρ will again have a negative value. Velocities in the same direction will have the same sign, while velocities in opposite directions will have opposite signs.

For example, in the case of one positively charged particle group (e.g., a positive ion group) and one negatively charged particle group (e.g., an electron group), for a charge density for the positive ion group is set to +n, a charge density for the electron group is set to −n (i.e., the total numbers of positive ions and electrons are the same), and velocities in opposite directions ($\pm v_{ion}$ and $-v_{electron}$), the resultant magnetic field is $$B_{Combined} = \frac{\mu_0(v_{ion})(+n)r}{2} + \frac{\mu_0(-v_{electron})(-n)r}{2}$$

$$B_{Combined} = \frac{\mu_0 v_{ion} nr}{2} + \frac{\mu_0 v_{electron} nr}{2}$$

Thus, when the negatively charged particle group and positively charged particle group are moving in opposite directions, the magnetic fields combine in an additive way, rather than canceling.

Similarly, in the case of two positively charged ion beams (IBs) (e.g., two positive ion groups) and one negatively charged electron beam (EB) (e.g., an electron group), for a charge density for each positive ion beam set to +n, a charge density for the electron beam set to −2n (i.e., the total numbers of electrons and positive ions are the same), and velocities in the same direction for the positively charged ion beams ($+v_{IB1}$ and $+v_{IB2}$) and opposite direction for the electron beam ($-v_{electron}$) the resultant magnetic field is $$B_{Combined} = \frac{\mu_0(+v_{IB1})(+n)r}{2} + \frac{\mu_0(v_{IB2})(+n)r}{2} + \frac{\mu_0(-v_{electron})(-2n)r}{2}$$

$$B_{Combined} = \frac{\mu_0 v_{IB1} nr}{2} + \frac{\mu_0 v_{IB2} nr}{2} + \mu_0 v_{electron} nr$$

Again, when the negatively charged particle group and the positively charged particle groups are moving in opposite directions, the magnetic fields combine in an additive way, rather than canceling. The magnetic field is a function of radius and is directed tangentially to the cylindrically symmetric overlapping charged particle groups.

The combined magnetic field can be substituted into the Lorentz force equation to calculate the force due to magnetic fields acting upon an ion or electron anywhere in the overlapping charged particle groups. Ignoring the electric forces, the resultant magnetic force upon a given charged particle having a charge +q (positive ion) or −q (electron) with a velocity v is $E_{Magnetic} = q(v \times B)$. Due to the symmetry, directions, and common axis of the charged particle groups, the magnetic force can be simplified as $F_{Magnetic} = qvB_{combined}$. For a positive ion or an electron, the forces anywhere in the combined group is $$F_{Magnetic(Ion)} = (+q)(+v)B_{Combined(Ion)} = qvB_{Combined(Ion)}$$

$$F_{Magnetic(Electron)} = (-q)(-v)B_{Combined(Electron)} = qvB_{Combined(Electron)}$$

Such a result indicates that the magnetic forces on each ion or electron in the bunch are directed radially inward toward the common axis.

Given that the combined electric forces cancel, the total Lorentz force (electric and magnetic forces) acting on a given ion or electron throughout the combined group is $$F_{Total(Ion)} = +q(E_{Combined(Ion)} + vB_{Combined(Ion)}) = qvB_{Combined(Ion)}$$

$$F_{Total(Electron)} = -q(E_{Combined(Electron)} - vB_{Combined(Electron)}) = qvB_{Combined(Electron)}$$

Thus, in counter-propagating overlapping electron and positive ion groups, the forces acting on the overlapping groups are directed radially inward, resulting in a compressive force that tends to increase the charge density of each electron or positive ion group. For co-propagation of positive ion groups and electron groups, the electric forces can still exactly cancel, but the magnetic forces are in opposite directions, at least partially canceling one another. In systems where the positive ion groups and electron groups can repeatedly interact with one another in alternating co-propagating and counter-propagating configurations (such as when repeatedly oscillating in the interaction region 130 orientation between adjacent voltage elements 110 in the vacuum system 100 shown in FIG. 1), the overall effect can be a tendency to radially compress the positive ion and electron groups, narrowing radial distributions of each.

It will be appreciated that although description is provided with respect to electrons, other negatively charged particles, such as negative ions, may behave similarly to electrons, and thus the use of electrons in the present description may be equivalent and represent the behavior of negative ions as well. Stated another way, negative ions may optionally be substituted in place of electrons. By generating counter-propagating positive and negative ion groups, cancelation of electric forces and additive magnetic forces in an interaction region can result in compression of both the positive and negative ion groups.

D. Pre-Compression

An additional design element of a compression system may utilize pre-compression of different ion groups and electron groups before and during the periods in which they overlap in the interaction region, and assist in producing maximum self-compression. For example, two ways in which the bunches can be pre-compressed are described. The first makes use of electric fields and the second makes use of magnetic fields. In one embodiment, an Einzel lens is placed along the common axis over which the ion groups and electron groups traverse, in order to focus the bunches. The lens may be physically placed or configured via computer control (as explained below) and generally includes three or more linearly disposed or placed electrodes with specifically designed voltages placed upon them such that there is the electrical equivalent of an optical 'focusing' effect upon the charged particles that travel through the lens. The focal point can optionally be set for the center point of the interaction region, which is along the common axis upon which the groups travel. By setting the focal point accordingly, the charged particles can be 'focused' or pre-compressed, aiding in the subsequent self-compression that occurs as ion groups and electron groups overlap, for example.

In addition to electric fields, magnetic fields may be used. An example magnetic pre-compression configuration may use a coil made of conductive wire that is wound around and down the length of the plasma compression system, such as around the interaction region. With current flowing through the coil, an axial magnetic field is created down the length of the coil and in line with the common axis upon which the groups traverse the length of the plasma compression system.

In some embodiments, combinations of electric and magnetic field effects may be used, such as combinations of Einzel lenses and magnetic coils. However, in some embodiments, pre-compression may not be employed. Whether pre-compression is used or not, plasmas may undergo self-compression.

III. Plasma Self-Compression Systems

Overlapping positive and negative charged particle groups having the same number of positively charged particles as negatively charged particles may be referred to herein as a plasma. When the positive ions groups and electron groups are moving in opposite directions, for example, the overlapping groups may experience compression, as described above. This compression phenomenon may be referred to herein as plasma self-compression and may be useful for generating tightly concentrated groups of electrons or groups of positive and/or negative ions, for example. Vacuum systems, such as those illustrated in FIG. 1 are useful, for example for generating self-compressed plasmas, and may be referred to as plasma self-compression systems. FIGS. 3A-3D, 4A-4D, 5A-5C, and 6 provide schematic illustrations different plasma self-compression system configurations, which will be described below. In FIGS. 3A-3D, 4A-4D, 5A-5C, and 6, various elements of a vacuum system may not be shown for purposes of illustration and simplification of the description. Accordingly, it will be appreciated that elements other than those illustrated in FIGS. 3A-3D, 4A-4D, 5A-5C, and 6 may be present in a plasma self-compression system, such as any one or more of the vacuum system elements, including pluralities of the individual elements, depicted in FIG. 1. For example, charged particle sources may not be explicitly depicted in FIGS. 3A-3D, 4A-4D, 5A-5C, and 6 so as not to obscure other details, but the plasma self-compressions may, nevertheless, include charged particle sources. In addition, other conventional elements, such as ion optics, vacuum components, etc., may not be illustrated in FIGS. 3A-3D, 4A-4D, 5A-5C, and 6 but may be present in a plasma self-compression system.

A. Linear Configuration for Charged Particle Bunches

FIGS. 3A-3D, FIGS. 4A-4D, and FIGS. 5A-5C provide various time snapshots of a plasma self-compression system having a linear configuration. In FIGS. 3A-3D plasma self-compression system 300 is used to compress an electron bunch 305, a first positive ion bunch 310, and a second positive ion bunch 315. A plurality of voltage elements are included in plasma self-compression system 300. A first voltage element 320 and a second voltage element 325 are positioned in an outermost arrangement, with a third voltage element 330 and a fourth voltage element 335 positioned in an intermediate arrangement, and a fifth voltage element 340 and a sixth voltage element 345 positioned in an innermost arrangement in the plasma self-compression system 300. It will be appreciated that, although each voltage element 320, 325, 330, 335, 340, and 345 is depicted as including five ring electrodes, any suitable configuration for the voltage elements 320, 325, 330, 335, 340, and 345 may be used. For example 1, 2, 3, 4, 5, or more ring electrodes may be independently used for each voltage element. Further, although ring electrodes are illustrated, other electrode shapes and/or configurations may be used. It will further be appreciated that the distances between voltage elements in the figures is not to scale and is merely for illustration purposes to show example relative positions and orientations of different voltage elements that may be used to direct electron bunch 305 toward first positive ion bunch 310 and second positive ion bunch 315.

Figure 3A:
FIG. 3A, FIG. 3B, FIG. 3C, and FIG. 3D provide schematic illustrations of an example plasma compression system, with various time snapshots depicting evolution of a plasma compression process.

In FIG. 3A, electron bunch 305 is shown as emerging from voltage element 325 toward voltage element 335. Similarly, first ion bunch 310 is shown as emerging from voltage element 340 toward voltage element 345 and second ion bunch 315 is shown as emerging from voltage element 330 toward voltage element 340. FIG. 3A may reflect a point in time just after the charged particle bunches are injected into plasma self-compression system 305. This configuration may reflect the placement of an electron source at or near voltage element 325, placement of a first ion source at or near voltage element 340, and placement of a second ion source at or near voltage element 330. Voltages may be independently applied to any one or more of voltage elements 320, 325, 330, 335, 340, and 345 to appropriately accelerate electron bunch 305, first positive ion bunch 310, and second positive ion bunch 315 towards the center of the figure. It will be appreciated that electrons are considerably lighter than all ions, even bare hydrogen ions (protons), and so the electron bunch 305 may have a significantly higher velocity than either of the first positive ion bunch 310 or second positive ion bunch 315. Different voltages applied to the voltage elements 320, 325, 330, 335, 340, and 345 may be used, however, to control the velocities of electron bunch 305, first positive ion bunch 310, and second positive ion bunch 315. To ensure that electron bunch 305, first positive ion bunch 310, and second positive ion bunch 315 all overlap at the same time, second positive ion bunch 315 may have a higher velocity than first positive ion bunch 310.

Figure 3B:

After some time passes, electron bunch 305, first positive ion bunch 310, and second positive ion bunch 315 may continue traveling towards the center of the figure, as illustrated in FIG. 3B. Voltages on voltage elements 320, 325, 330, 335, 340, and 345 may again be independently applied to allow unimpeded travel of the charged particle bunches. In some cases, voltages on voltage elements 320, 325, 330, 335, 340, and 345 may be adjusted as a function of time to accelerate, focus, or modify bunching of electron bunch 305, first positive ion bunch 310, and second positive ion bunch 315.

Figure 3C:
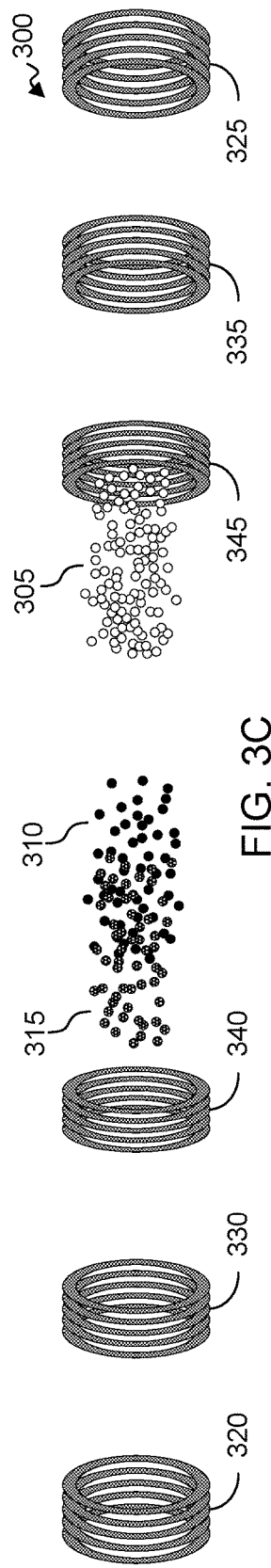

FIG. 3C shows a further time step, as electron bunch 305, first positive ion bunch 310, and second positive ion bunch 315 continue traveling towards one another and move between voltage elements 340 and 345. As electron bunch 305, first positive ion bunch 310, and second positive ion bunch 315 begin to overlap, repulsive electric field effects between positive ions in first positive ion bunch 310 and second positive ion bunch 315 begin to cancel due to the attractive electric field effects between electrons in electron bunch 305 and the positive ions in first positive ion bunch 310, and second positive ion bunch. Similarly, the repulsive electric field effects between electrons in electron bunch 305 begin to cancel due to the attractive electric field effects between electrons in electron bunch 305 and the positive ions in first positive ion bunch 310, and second positive ion bunch.

Figure 3D:
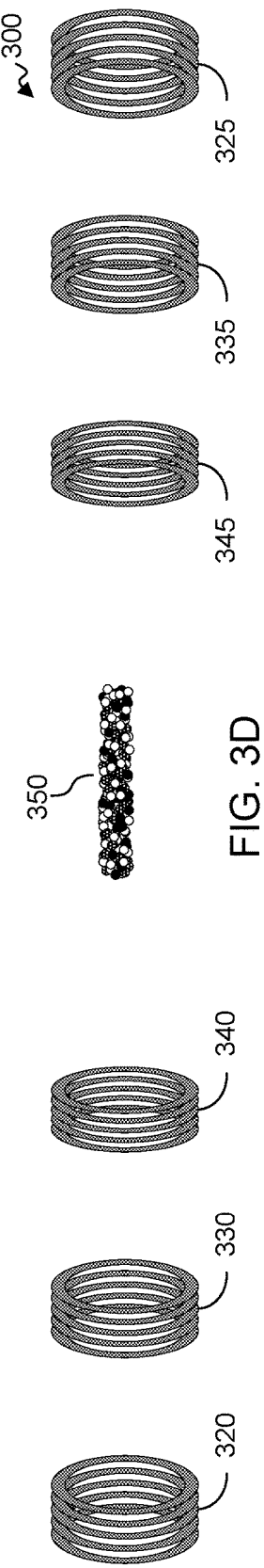

The magnetic forces on each electron and each positive ion, however, become additive and so when the electron bunch 305, first positive ion bunch 310, and second positive ion bunch 315 begin to overlap, the magnetic forces tend to direct the electrons and positive ions toward their common axis, forming a compressed plasma 350, as schematically illustrated in FIG. 3D, at least for an instance. After the time snapshot depicted in FIG. 3D, the electron bunch 305 continues moving toward voltage element 340, and first positive ion bunch 310 and second positive ion bunch 315 continue moving toward voltage element 345.

B. Linear Configuration for Oscillating Charged Particle Groups

Voltages applied to voltage elements 320, 325, 330, 335, 340, and 345 may be used to decelerate and reverse a direction of travel of electron bunch 305 first positive ion bunch 310, and second positive ion bunch 315 to allow for multiple interactions between them. For example, the voltages applied to voltage elements 320 and 325 may allow these elements to operate as electrostatic mirrors for the electrons in electron bunch 305. For example, a large negative potential may be applied to voltage elements 320 and 325 to create a repulsive potential and trap electron bunch 305, allowing electron bunch 305 to repeatedly oscillate between voltage elements 320 and 325.

Similarly, the voltages applied to voltage elements 340 and 345 may allow these elements to operate as electrostatic mirrors for the positive ions in first positive ion bunch 310 but only slow down the positive ions from second positive ion bunch 315, while the voltages applied to voltage elements 330 and 335 may allow these elements to operate as electrostatic mirrors for the positive ions in second positive ion bunch 315. By setting a voltage elements 340 and 345 to a potential that is insufficient for the positive ions in first positive ion bunch 310 to overcome, first positive ion bunch 310 may become trapped and repeatedly oscillate between voltage elements 340 and 345. The positive ions in second positive ion bunch 315, however, may have a higher velocity that is sufficient for those ions to overcome the potential barrier established by voltage elements 340 and 345, but insufficient to overcome the potential barrier established by voltage elements 330 and 335, allowing second positive ion bunch 315 to become trapped and repeatedly oscillate between voltage elements 330 and 335.

While electron bunch 305, first positive ion bunch 310, and second positive ion bunch 315 are oscillating between voltage elements as described above, with each subsequent overlap of electron bunch 305, first positive ion bunch 310, and second positive ion bunch 315 in which electron bunch 305 travels in an opposite direction to first positive ion bunch 310 and second positive ion bunch, the charged particles experience additional self-compression. Depending on the velocities, lengths between voltage elements, and other dimensional considerations, some configurations may allow each pass of electron bunch 305, first positive ion bunch 310, and second positive ion bunch 315 to overlap in space, allowing repeated self-compressive configurations. Other configurations, however, may allow electron bunch 305, first positive ion bunch 310, and second positive ion bunch 315 to pass one another going the same direction or to not be all present at the same point in space at the same time. These unoptimal overlaps will not result in undesirable spreading of the electron bunch 305, first positive ion bunch 310, and second positive ion bunch 315, but may reduce the spreading due to electric field effects whenever positive and negatively charged particle bunches overlap. Overall, however, significant compression of electron bunch 305, first positive ion bunch 310, and second positive ion bunch 315 may occur.

C. Linear Configuration for Charged Particle Beams

In FIGS. 4A-4D plasma self-compression system 400 is used to compress an electron beam 405, a first positive ion beam 410, and a second positive ion beam 415. A plurality of voltage elements are included in plasma self-compression system 400. A first voltage element 420 and a second voltage element 425 are positioned in an outermost arrangement, with a third voltage element 430 and a fourth voltage element 435 positioned in an intermediate arrangement, and a fifth voltage element 440 and a sixth voltage element 445 positioned in an innermost arrangement in the plasma self-compression system 400. It will be appreciated that, although each voltage element 420, 425, 430, 435, 440, and 445 is depicted as including five ring electrodes, any suitable configuration for the voltage elements 420, 425, 430, 435, 440, and 445 may be used. For example 1, 2, 3, 4, 5, or more ring electrodes may be independently used for each voltage element. Further, although ring electrodes are illustrated, other electrode shapes and/or configurations may be used. It will further be appreciated that the distances between voltage elements in the figures is not to scale and is merely for illustration purposes to show example relative positions and orientations of different voltage elements that may be used to direct electron beam 405 toward first positive ion beam 410 and second positive ion beam 415.

Figure 4A:
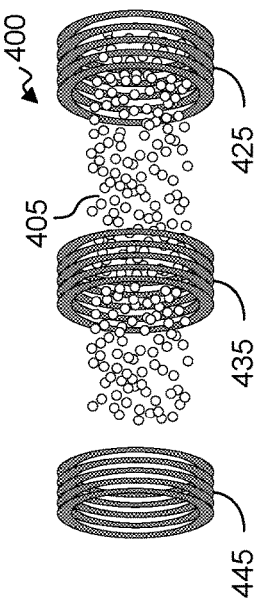
FIG. 4A, FIG. 4B, FIG. 4C, and FIG. 4D provide schematic illustrations of an example plasma compression system, with various time snapshots depicting evolution of a plasma compression process.

In FIG. 4A, electron beam 405 is shown as emerging from voltage element 425 toward voltage elements 435 and 445. Similarly, first ion bunch 410 is shown as emerging from voltage element 440 toward voltage element 445 and second ion bunch 415 is shown as emerging from voltage element 430 toward voltage elements 440 and 445. FIG. 4A may reflect a point in time just after the charged particle beams begin injection into plasma self-compression system 405. This configuration may reflect the placement of an electron source at or near voltage element 425, placement of a first ion source at or near voltage element 440, and placement of a second ion source at or near voltage element 430. Voltages may be independently applied to any one or more of voltage elements 420, 425, 430, 435, 440, and 445 to appropriately accelerate electron bunch 405, first positive ion bunch 410, and second positive ion bunch 415 towards the center of the figure. It will be appreciated that electrons are considerably lighter than all ions, even bare hydrogen ions (protons), and so the electrons in electron beam 405 may have a significantly higher velocity than the positive ions of either of the first positive ion beam 410 or second positive ion beam 415. Different voltages applied to the voltage elements 420, 425, 430, 435, 440, and 445 may be used, however, to control the velocities of electrons in electron beam 405, and positive ions in first positive ion beam 410 and second positive ion beam 415. In some embodiments, the positive ions of first positive ion beam 410 have lower velocities than the positive ions of second positive ion beam 415.

Figure 4B:
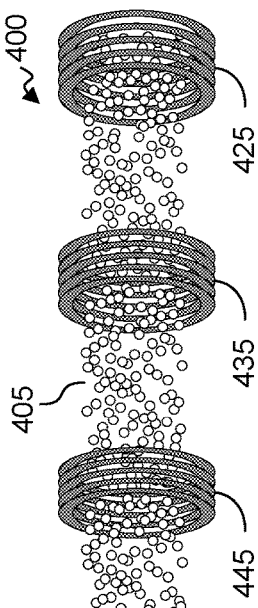
Figure 4C:
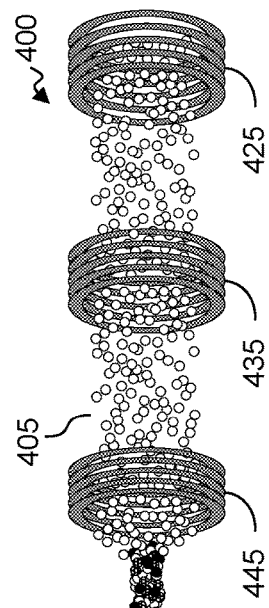

FIG. 4B depicts a point in time just before electrons from electron beam 405 begin overlapping with positive ions from first positive ion beam 410 and second positive ion beam 415. Voltages on voltage elements 420, 425, 430, 435, 440, and 445 may be independently adjusted to modify velocities of the charged particle bunches. FIG. 4C shows a further time step, where electron beam 405, first positive ion beam 410, and second positive ion beam 415 almost completely overlap in the space between voltage elements 440 and 445. As illustrated, plasma 450 experiences self-compression, resulting in narrowing of a radial distribution of the electron beam 405, first positive ion beam 410, and second positive ion beam 415. Again, repulsive electric field effects between positive ions in first positive ion beam 410 and second positive ion beam 415 begin to cancel due to the attractive electric field effects between electrons in electron beam 405 and the positive ions in first positive ion beam 410, and second positive ion beam 415. Similarly, the repulsive electric field effects between electrons in electron beam 405 begin to cancel due to the attractive electric field effects between electrons in electron beam 405 and the positive ions in first positive ion beam 410, and second positive ion beam 415. Again, magnetic forces on each electron and each positive ion become additive when the electron beam 405 is traveling in an opposite direction to first positive ion beam 410 and second positive ion beam 415.

Figure 4D:
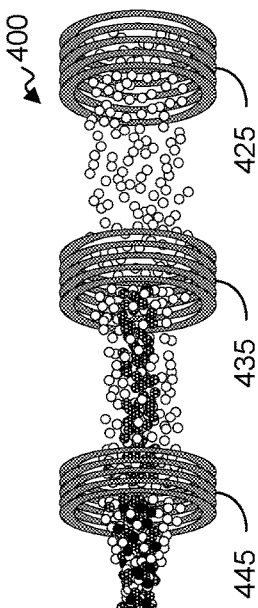

Voltages applied to voltage elements 420, 425, 430, 435, 440, and 445 may be used to decelerate and reverse a direction of travel of electron beam 405, first positive ion beam 410, and second positive ion beam 415 toward the center of the figure. As illustrated in FIG. 4D, with appropriately configured voltages, electron beam 405 can pass through voltage elements 430, 435, 440, and 445, with voltage elements 420 and 425 operating as electrostatic mirrors for the electrons of electron beam 405. Similarly, second positive ion beam 415 can pass through voltage elements 440 and 445, with voltage elements 430 and 435 operating as electrostatic mirrors for the positive ions of second positive ion beam 415 and voltage elements 440 and 445 operating as electrostatic mirrors for the positive ions of first positive ion beam 410.

With continuous overlap of electron beam 405, first positive ion beam 410, and second positive ion beam 415, with a density of electrons equal to the combined densities of positive ions, the electric field effects will cancel, reducing radial spread of the charged particle beams due to electric field effects. When positive ions and electrons are moving past one another in opposite directions, their magnetic interactions will become additive, resulting in additional radial self-compression, narrowing the charged particle radial distributions.

D. Plasmoid Generator Configuration

Figure 5A:
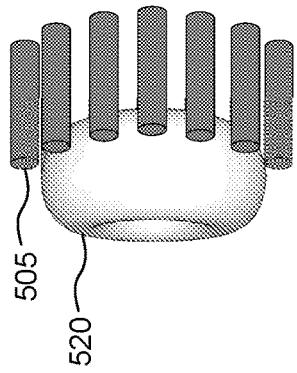
FIG. 5A, FIG. 5B, and FIG. 5C provide schematic illustrations of an example plasma compression system, with various time snapshots depicting evolution of a plasma compression process, with charged particles generated using a plasmoid generator.
Figure 5A:
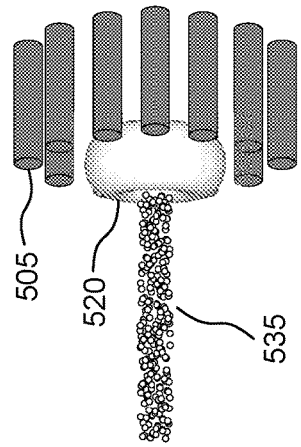
Figure 5A:
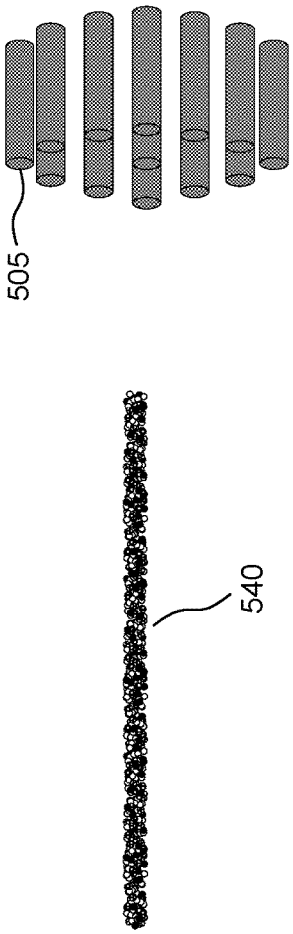
Figure 5A:
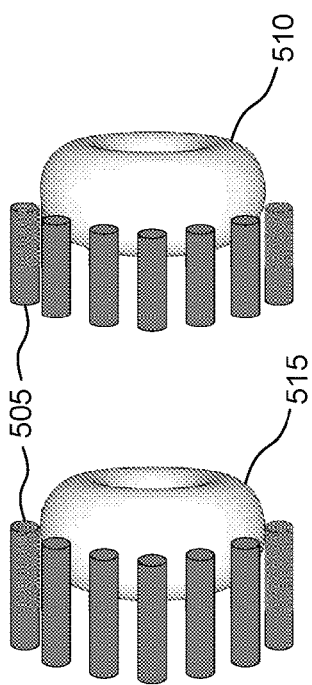
Figure 5B:
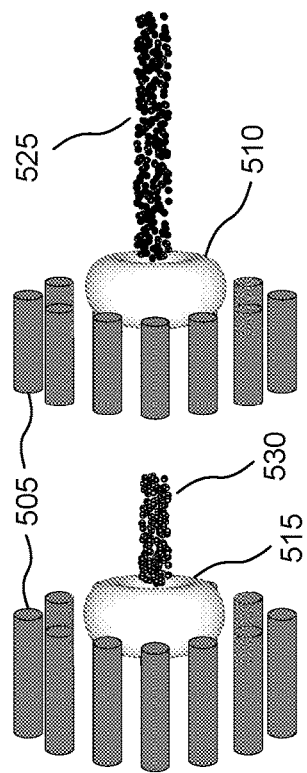
Figure 5C:
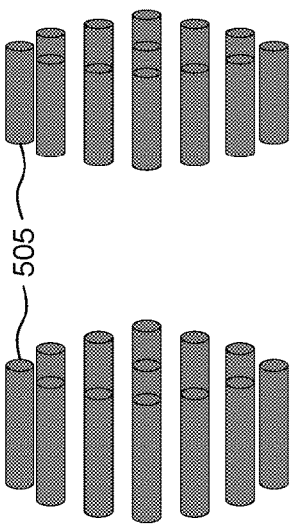

FIGS. 5A-5C show an example of a triple plasmoid generator configuration at different time snapshots. A plasmoid is generally created by the initiation of a very high current arc between a central electrode and many radially and concentrically placed electrodes. In FIGS. 5A-5C, the electrodes are depicted as elements 505. The direction of the high current arcs depend on the voltages utilized, but may be from a central electrode to the peripheral electrodes or from the peripheral electrodes to the central electrode. The very high current arcs travels through neutral ionizable gas, which is not shown explicitly in FIGS. 5A-5C, but may be present throughout the vacuum system volume housing the plasmoid generators. The ionizable gas may be ionized by the high current arc, creating positive ions. The high current arcs may undergo various instabilities including filamentation, kinking, compression, etc., resulting in a very highly compressed toroidal plasma, including both positive ions and electrons.

On the 'run down' or 'extinguishing' phase of a plasmoid, intense electric fields can be setup by the intense and rapidly decreasing magnetic fields that give a plasmoid its features. These intense electric fields then act upon the ions and electrons that make up the plasmoid, directing high density beams of ions and electrons in opposite directions along the central axis of the plasmoid. In this way, a plasmoid can be used as a particle source.

After being fully compressed into a very small and dense plasmoid, the plasmoid may rapidly lose energy through Bremstrahlung and the intense magnetic fields throughout the plasmoid quickly may decrease in time, creating a very intense electric field down the axis (i.e., through the hole) of the plasmoid. This high intensity electric field then accelerates positive ions (including ions just ionized through the formation of the plasmoid itself) in a directed fashion (e.g., down the axis of the plasmoid) and at the same time accelerates electrons in the plasmoid in the opposite direction.

An example configuration is depicted in FIG. 5A, where three separate plasmoids 510, 515, and 520, are established, one for generating each of the two or more groups for the self-compression mechanism outlined above to occur (e.g., positive ion and electron groups). In the configuration depicted in FIG. 5A, two plasmoids 510 and 515 (plasmoid generators for first positive ion group 525 and second positive ion group 530, respectively) are timed in terms of their creation and driving energy to form first positive ion group 525 and second positive ion group 530 during run down, as depicted in FIG. 5B. The two plasmoids 510 and 515 creating the first positive ion group 525 and second positive ion group 530 may be placed in the same orientation and spaced accordingly along the common linear axis such that the first positive ion group 525 and second positive ion group 530 are directed in the same direction. The timing and voltages used may provide first positive ion group 525 and second positive ion group 530 with a relative velocity between them, such that they are moving in one direction along a linear common axis with different velocities.

A third plasmoid 520 is used to create an electron group 535 during run down, as illustrated in FIG. 5B, moving in the opposite direction to the first positive ion group 525 and second positive ion group 530. The third plasmoid 520 that creates the electron group 535 may be reversed in configuration as compared to plasmoids 510 and 515, such that when the electron group 535 is accelerated from the plasmoid, the electron group 535 is directed at the first positive ion group 525 and second positive ion group 530. When the first positive ion group 525 and second positive ion group 530 and the electron group 535 meet to form a plasma 540, as depicted in FIG. 5C, the self-compression mechanism outlined above takes place and the two already very dense positive ion groups 525 and 530 generated by plasmoids 510 and 515 and electron group 535 generated by plasmoid 520 all compress to an even greater magnitude.

E. Ring Configuration

Figure 6:
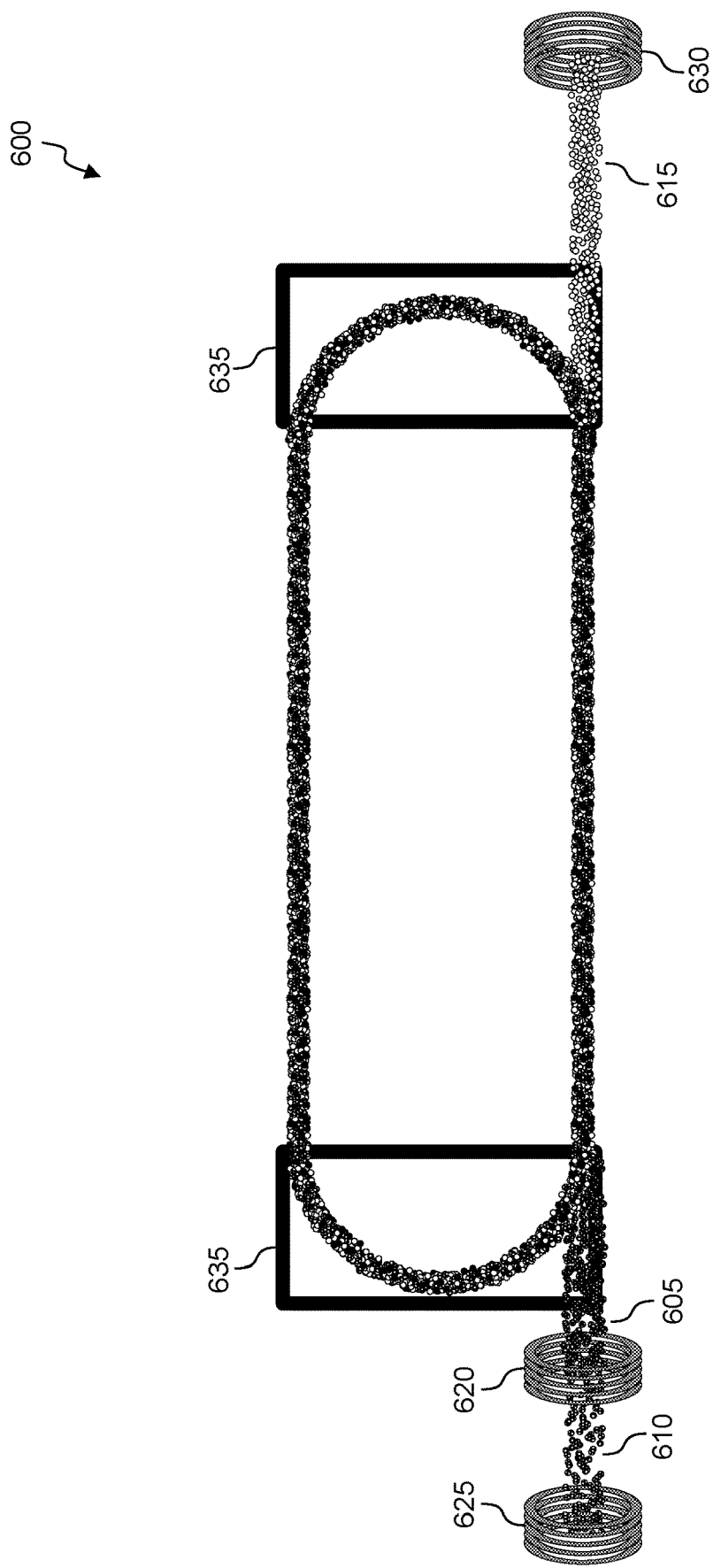
FIG. 6 provides a schematic illustration of an example plasma compression system arranged in a ring configuration.

Instead of being organized in a linear configuration, a plasma compression system may be arranged in a ring configuration, allowing cycling of charged particles in a continuous fashion. FIG. 6 provides a schematic illustration of a plasma self-compression system 600 having a ring arrangement. Similar to the plasma self-compression system 400 depicted in FIGS. 4A-4D, plasma self-compression system 600 may include one or more positively charged particle sources and a negatively charged particle sources. For example, voltage elements 620, 625, and 630 may be arranged to direct a first positive ion beam 605, a second positive ion beam 610 toward an electron beam 615 along a common axis. Voltage elements 620, 625, and 630 may be used to accelerate the positive ion and electron beams to sufficient velocities for plasma self-compression to take place when the beams overlap.

Deflection sections 635 are present in plasma self-compression system 600, which may correspond to magnetic field deflection sections, electric field deflection sections, or sections using combinations of magnetic fields and electric fields. Deflection sections 635 may be controlled to cause the first positive ion beam 605, the second positive ion beam 610, and the electron beam 615 to follow along an arced path, which may result in the beams looping around along a continuous path. Thus, the common axis that the particles travel along may be viewed as including curved and/or linear sections. As illustrated in FIG. 6, first positive ion beam 605 and second positive ion beam 610 may travel in a counter-clockwise fashion and electron beam 615 may travel in a clockwise fashion.

Although plasma-self compression system 600 is illustrated as having two semi-circular deflection sections and two linear sections, other ring configurations are contemplated, including a circular ring configuration, an oval ring configuration, an elliptical ring configuration, or other ring configurations that allow the positive ion beams and electron beam to propagate in opposite directions. By employing counter-propagating positively charged particle beams and negatively charged particle beams, the beams can undergo continuous plasma self-compression, as outlined above, resulting in the radial distributions of the beams narrowing and generating high charged particle densities.

IV. Fusion

In some embodiments, plasma compression systems may be useful as fusion systems. The high charged particle densities that can be achieved using the plasma compression systems described above with reference to FIGS. 1, 3A-3D, 4A-4D, 5A-5C, and 6 can advantageously allow fusion between the different positively charged ions to take place at a desirable rate. When used to drive fusion reactions, a plasma compression system may be referred to herein as a fusion trap.

Fusion or nuclear fusion are terms used to describe the collision of two atomic nuclei (generally ions) at high enough velocities and kinetic energies that they overcome the Coulomb barrier and combine to form one or more new atomic nuclei and subatomic particles—a process that releases large amounts of energy due to the mass difference between the nuclei before the collision (the reactants) and the nuclei and particles after collision (the products).

In order to produce commercially viable levels of power in a fusion reactor, both the number of fusion reactions per second and the kinetic energy of the nuclei that are fusing must be sufficiently high. While imparting these levels of kinetic energy can be done either thermally or electrostatically, increasing the rate of fusion has proven much more difficult and requires high ion densities or a large fusion interaction volume. The below equation for fusion power describes the relationship between the fusion output power ($P_{fusion}$), the number densities of two ion species ($n_1$ and $n_2$), the relative velocity between the two ion species, the fusion cross section for the two ion species or the experimentally derived probability of fusion between the two ion species occurring ($\sigma$), the energy released per fusion event ($E_{fusion}$), and the interaction volume ($V_{fusion}$):

$$P_{fusion} = n_1 \cdot n_2 \cdot \sigma \cdot v_{rel} \cdot E_{fusion} \cdot V_{fusion}$$

The cross section and relative velocities may be effectively set at specific values based on the chosen fusion reactants and can both be considered constant in value. In the same regard, the energy released per fusion event is also constant per a set of known fusion products. This leaves the densities for the two ion species and the interaction volume as the two variables that can be modified in order to produce fusion.

Increasing either the ions' densities or the reactor's fusion volume can result in an increase in fusion power output. Since increasing the fusion interaction volume may quickly become untenable, as an increase in fusion power output would require an equal increase in reactor volume, a more useful solution is to increase the densities of the two fusion ion species. By using the plasma self-compression techniques described above, the ion densities of the two fusion ion species can be increased to a level where desirable fusion output power can be achieved.

A. Plasma Self-Compression

As will be appreciated in view of the foregoing descriptions, the self-compression mechanism described herein is a recursive process that can produce a maximum or suitable fusion ion densities and fusion output power. When combined positive ion groups and electron groups overlap, self-compression of all the positive ions and electrons occur due to the elimination of space charge (electric fields and associated forces) and the combined radial inward forces of the magnetic fields generated by the combined groups. As this self-compression takes place, the charged particle density within the ion groups and the electron group increases. As described above, the magnetic forces are a function of charged particle density and so the aforementioned charged particle density increase causes the combined magnetic fields to more strongly direct the charged particles radially inward, recursively compressing the charged particles. This recursive process can quickly result in orders of magnitude increase in fusion ion density and, accordingly, fusion output power.

B. Fusion Trap Systems

Figure 7:
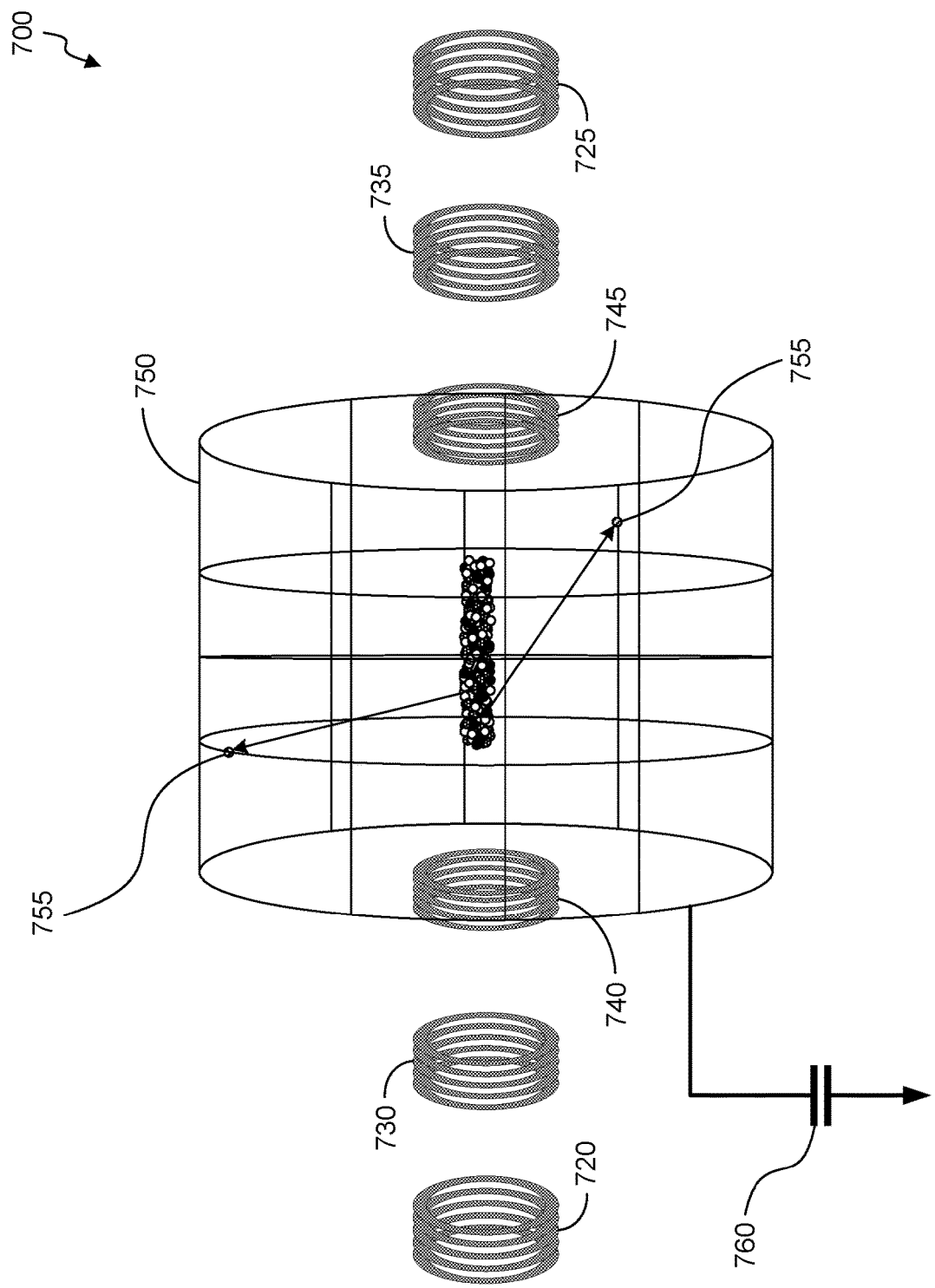
FIG. 7 provides a schematic illustration of an example fusion trap system.

FIG. 7 provides a schematic illustration of an example fusion trap 700, similar to the configuration of the plasma compression systems 300 and 400 depicted in FIGS. 3A-3D and 4A-4D. It will be appreciated that other configurations may be used for a fusion trap, including a ring configuration or employing plasmoid generators. Fusion trap 700 includes voltage elements 720, 725, 730, 735, 740, and 745. Fusion trap 700 may include particle generators, but these elements are not depicted in FIG. 7 so as not to obscure other details. For an electron generator located on the right side of fusion trap 700, voltage element 725 may operate first to accelerate the electron group towards the center of the fusion trap 700 and then as an electrostatic mirror for the electrons, while voltage element 720 may operate as an electrostatic mirror for the electrons. For a first positive ion generator and second positive ion generator located on the left side of fusion trap 700, voltage elements 730 and 740 may operate first to accelerate the positive ions towards the center of the fusion trap 700 and then as an electrostatic mirror for the positive ions, while voltage elements 735 and 745 may operate as an electrostatic mirror for the positive ions, similar to the configuration described above with reference to FIGS. 3A-3D and 4A-4D.

By using a configuration where the ions and electrons can be reflected by the voltage elements operating as electrostatic mirrors, the ions and electrons can undergo multiple self-compression cycles each time the ions and electrons overlap one another going in opposite directions, allowing the fusion trap 700 to operate as a charged particle trap. This can result in significant self-compression, increasing the charged particle density immensely. Additionally, each time the first positive ion group and the second positive ion group pass one another this allows for another chance for fusion to occur. Furthermore, as compared to a configuration where only a single pass is used and the ions and electrons removed, by using this configuration, the ions and electrons can be effectively reused, reducing the energy and materials needed to generate additional ions and electrons to replace lost ions and electrons. In effect, the voltage elements, operating as electrostatic mirrors, may allow recapture of the kinetic energy of the charged particles during deceleration and then reuse of the captured energy in reaccelerating the charged particles in the opposite direction.

In some embodiments, ions and electrons can be maintained within a fusion trap until any two fusion ions in the system undergo fusion whereupon the products created can leave the reactor and be converted into electricity. Upon exiting the linearly disposed volume of the ion and electron traps, in any direction radially outward from the common axis upon which the fusion ion and electron bunches are traveling, the kinetic energy of the fusion products (where the released energy is stored) can be captured and directly converted into electricity. For example, a collection grid 750 may surround a portion of an interaction region where different ion and electron groups may pass one another and undergo plasma self-compression. In one example, a collection grid 750 may correspond to a direct energy converter, such as a radially distributed grid of conductive wires, functioning as electrodes, with the proper voltages upon them to create the electric fields required to decelerate fusion products 755, such as energetic alpha particles and other nuclei, and directly convert the kinetic energy of these products to electrical energy. This energy can then be used directly or stored in energy storage elements 760, such as capacitors, batteries, or other storage mediums for future use.

Although a collection grid is exemplified as a useful direct energy converter, it will be appreciated that a collection grid is just an example and that other direct energy converters may be used instead of or in addition to a collection grid. For example, energy from fusion products may be converted to heat and the heat may be used to generate electrical energy. Other examples are possible.

C. Timing and Control of Electrodes

The trapping of ions and electrons as described herein may refer to the linear traversal of bunches across the length of a trap, in either direction, without synchronization between ions and electrons, ions and ions, or electrons and electrons. In some embodiments, the ions and/or electrons may be retained in the trap until fusion occurs or they can no longer be retained due to natural loss processes. This may not result in an efficient reactor design, however, because without synchronization, the probability that the ions will fuse may be low. This may occur because about 50% of the ions (and electrons) in the trap can be moving in one direction while the other 50% can be moving in the opposite direction. While this will cancel space charge due to electric field effects, there will be no self-compression of the plasma as the two fusion ion groups are not traveling as bunches in one direction along the common axis while the electrons travel in bunch form in the opposite direction on the same axis.

To ensure that the conditions for maximum self-compression of the fusion ions and electrons are established and maintained, the fusion ions and electrons may be made to stay together in bunch form, or synchronized, such that the two sets of fusion ions and electrons each remain in bunch form indefinitely as they oscillate between the voltage elements operating as electrostatic mirrors. Two methods of creating and maintaining this environment may be employed. The first is the use of the natural bunching phenomenon observed in electrostatic ion and electron traps, and the second is the use of active bunch control using AC waveforms to form ion and electron bunches on demand, and the maintenance of those bunches over long periods of time as they oscillate between the mirrors. Both methods, and a number of combinations of the two can be used to produce the effect of synchronized ion bunching.

If the electric fields established by electrostatic mirrors are properly configured and biased, the ions in the traps may remain in bunch form for long periods of time as they bounce back and forth between the mirrors in a synchronized manner. If the electric fields are off by too much, the ions may not remain in bunch form for as long a period, and ions may disperse throughout the trap. Due to a reorganization of kinetic energies during acceleration and deceleration of the ions, a monoenergetic condition (all the ions basically have the same kinetic energy) or equilibrium may occur wherein the ions in the bunch remain close to one another and are maintained in bunch form. This synchronized ion bunching phenomenon may be achieved when the ions are injected into the ion trap with certain kinetic energies, and that the trap length, number of electrodes, electrode voltages, and other parameters is properly controlled to cause this bunching effect to occur, for example.

The second method referred to above involves the use of an ion or electron trap and causes groups of ions or electrons to form bunches dynamically, or on demand, and to remain in bunch form indefinitely. Using superimposed AC (and pulsed DC) waveforms over the ion (and electron) trap's existing electrostatic mirrors, and properly matching the applied waveforms to the individual characteristic frequencies of the two fusion ion bunches' and electron bunch's natural transit times (i.e., the time it takes a given bunch to traverse the length of the trap), any fusion ions or electrons in the trap can be longitudinally compressed to form bunches on demand whereupon they can be maintained in bunch form indefinitely (as long as the AC waveforms are applied). The AC waveforms produce an effect similar to that of the synchronized ion bunching behavior achieved by energy redistribution during acceleration and deceleration described above. By slowing down the fastest ions (or electrons) and speeding up the slowest ions (or electrons) in the trap, but doing so actively, unlike that of the static field induced bunching phenomenon, in a controlled fashion, a monoenergetic condition or equilibrium condition may be achieved.

V. Dynamically Reconfigurable Voltage Element Array

Rather than use a single plasma compression or fusion trap system configuration with a fixed number of voltage elements, a dynamically reconfigurable voltage element array configuration may optionally be employed, which may be useful for generating a wide variety of voltage element configurations, which may be configurable dynamically and in real time using a suitable voltage control circuit. An example voltage control circuit may optionally include custom software for logic, feedback, and control and may use custom circuit boards, field programmable gate array systems, pulse generators, sensors, AC waveform generators and other power supplies, and the like.

Figure 8A:
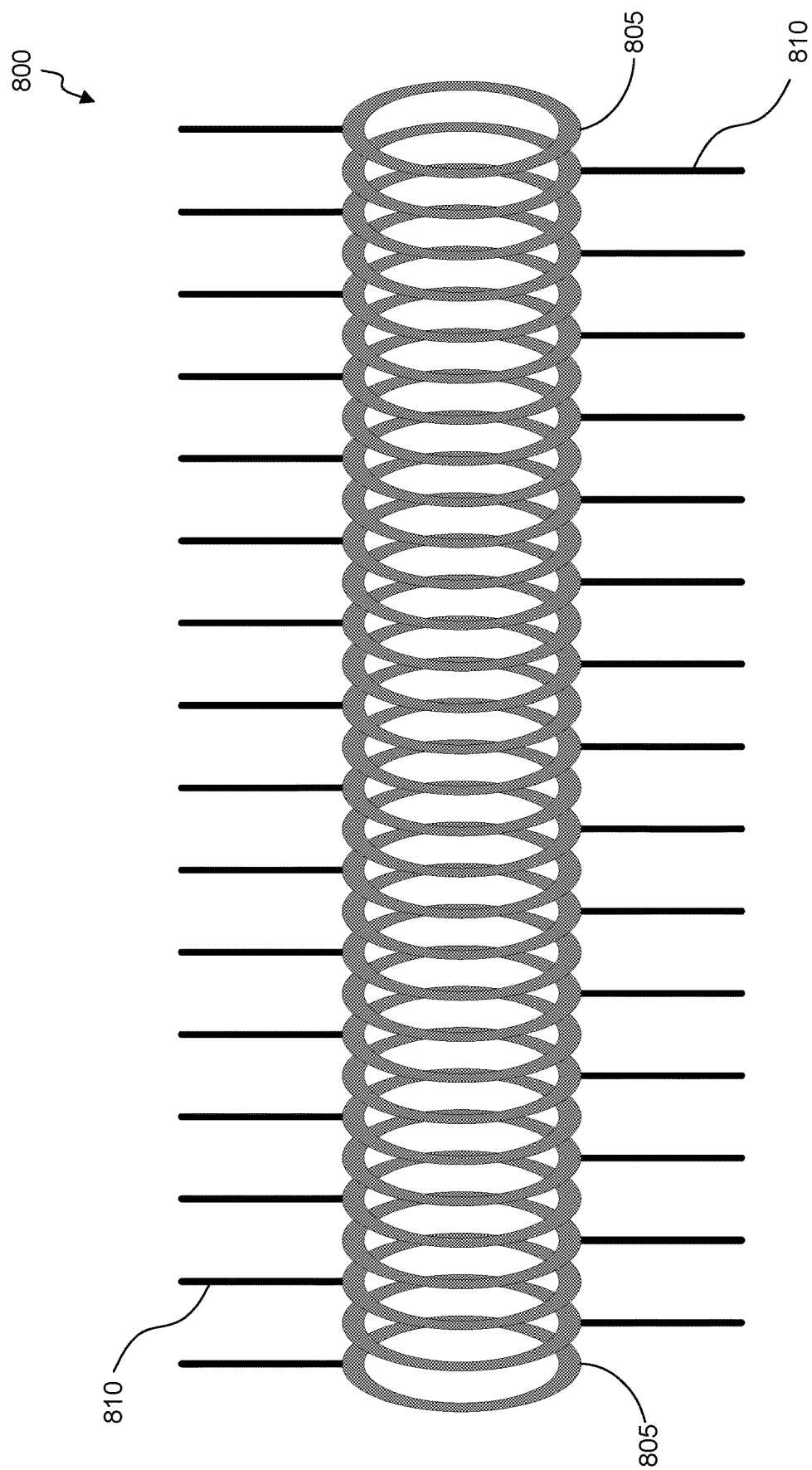
FIG. 8A, FIG. 8B, and FIG. 8C provide schematic illustrations of a dynamically reconfigurable voltage element array.

FIG. 8A depicts an example voltage element array 800, including a plurality of individual voltage elements 805 for use in a vacuum system, plasma compression system, or fusion trap system. The voltage elements are linearly distributed along a length of the system, and may be positioned uniformly spaced or non-uniformly spaced, depending on the desired configuration. Individual vacuum feedthroughs 810 may be provided for each individual voltage element in a vacuum system, plasma compression system, or fusion trap system to allow for individualized potentials to be applied to each and every voltage element. Individual potentials may be applied, removed, or otherwise modified in a short time frame, such as up to sub-picosecond time frames, based on the slew rate of the controller, AC waveform generator, pulse generator, power supply, etc. used for generating and controlling the potentials.

Advantageously, this allows each individual voltage element to have its potential changed nearly instantaneously, enabling real-time, dynamic, and reconfigurable control of all voltage elements. For example, each voltage element may at one moment serve as an electrode in an electrostatic mirror configuration for a positive ion group and at another moment serve as an electrode in an electrostatic mirror configuration for a negative ion group. As another example, each voltage element may at one moment serve as an electrode in an electrostatic mirror configuration and at another moment serve as part of a field free or drift region in the system. Optionally, computer control may be implemented to apply various control algorithms to establish a particular operational condition or set of changing operational conditions.

A variety of voltage element configurations may be applied in a vacuum system, plasma compression system, or fusion trap system, including, but not limited to, an electrostatic mirror for a positively charged particle group, an electrostatic mirror for a negatively charged particle group, a field free region, a charged particle trap, a charged particle injector, an Einzel lens, a bunching control electrode. Each of these configurations may optionally be varied in position, length, and applied potentials or voltages. In the voltage element array 800 of FIG. 8, each of these configurations may be applied across any one or plurality of individual voltage elements for any fixed or dynamically changing time duration. Optionally, each of these configurations can be configured to dynamically travel along the length of the reconfigurable voltage element array.

Figure 8B:
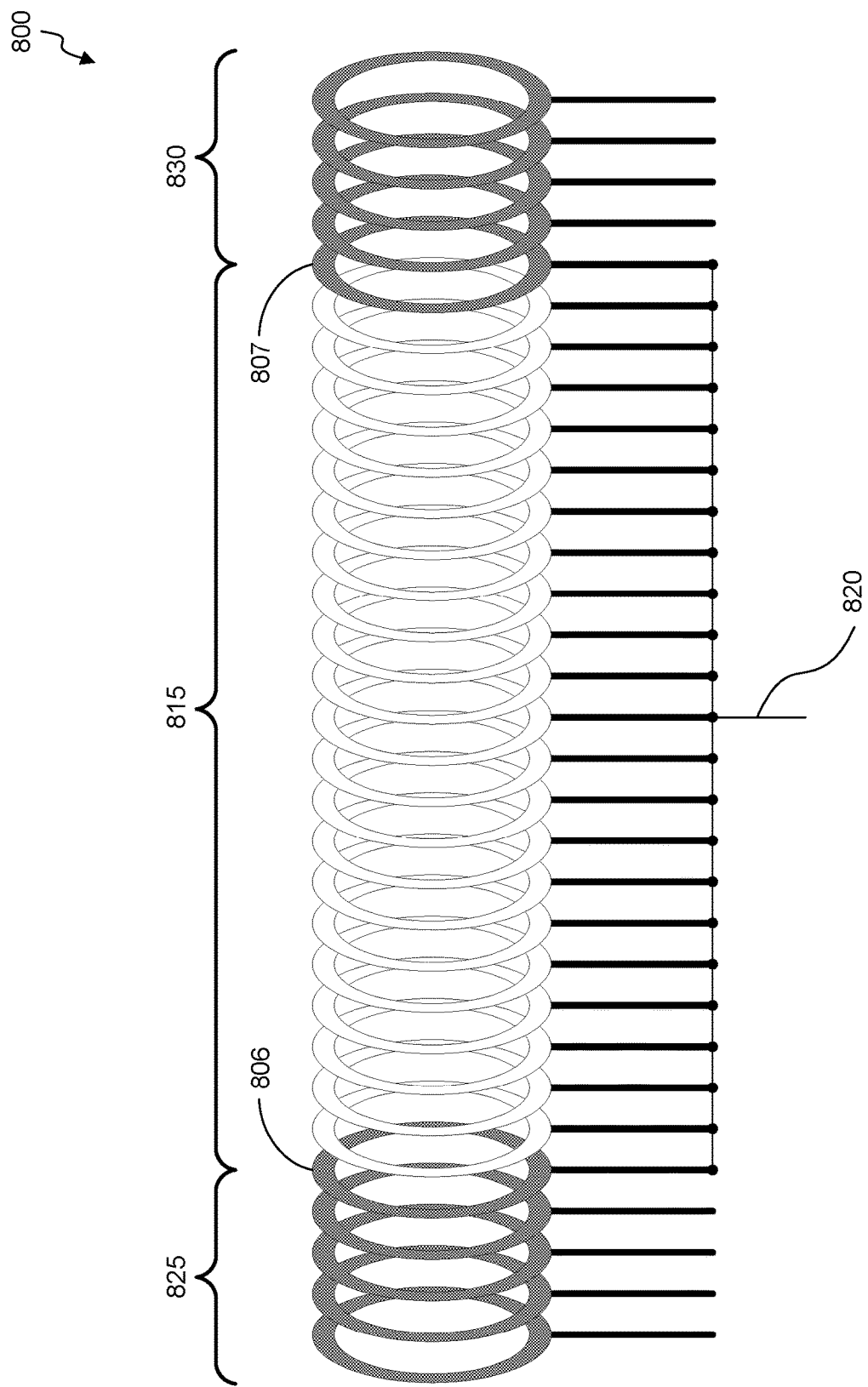

FIG. 8B depicts voltage element array 800 operating as a single charged particle trap, with a large field free region 815 between electrostatic mirrors 825 and 830. The voltage elements at field free region 815 are illustrated as electrically connected to the same potential 820 as the voltage elements 806 and 807 at the edges field free region 815. In FIG. 8B, the voltage elements in field free region 815 are depicted with a white color to aid in visualization and to indicate that no intentionally applied electric field is present within field free region 815, allowing any charged particles moving within to travel essentially unperturbed by the voltage elements and influenced primarily by particle-particle interactions. It will be appreciated that although FIG. 8B shows the voltage elements in field free region 815 as electrically connected to voltage elements 806 and 807, such a configuration is merely for illustrative purposes and that, in operation, the same potential 820 may simply be applied individually to each of the voltage elements in field free region 815 and to voltage elements 806 and 807 via each voltage element's corresponding vacuum feedthrough. The voltage elements of electrostatic mirrors 825 and 830, meanwhile, may have individually controlled potentials to each individual voltage element to provide suitable electric fields to decelerate and re-accelerate charged particles back and forth between electrostatic mirrors 825 and 830.

Figure 8C:
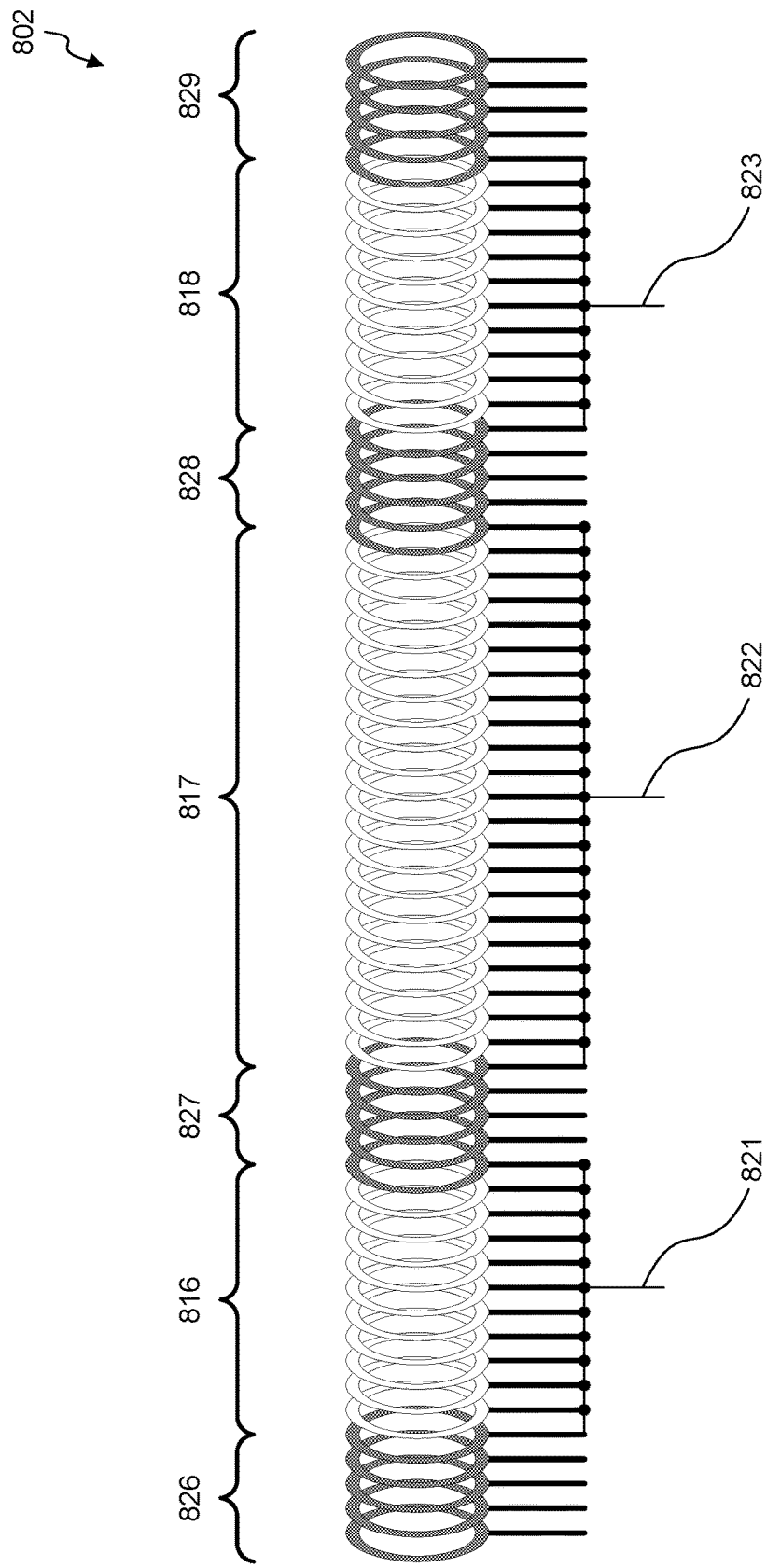

It will be appreciated that any suitable number of voltage elements may be included in a voltage element array and that the illustrated configurations are not intended to be limiting on the number of voltage elements in a dynamically reconfigurable voltage element array. As one example, FIG. 8C depicts another voltage element array 802, with more voltage elements than in voltage element array 800. In some embodiments, a voltage element array may include from 10 to 10000 voltage elements, or any number or range therebetween, such as from 100 to 1000 voltage elements, or 50, 100, 150, 200, 250, 300, 350, 400, 450, or 500 voltage elements, for example. In some embodiments, even more than 10000 voltage elements may be provided. In some embodiments, it may be desirable to employ an even number of voltage elements. In other embodiments, it may be desirable to employ an odd number of voltage elements. The maximum useful number of voltage elements in a vacuum system, plasma compression system, or fusion trap system may be dictated by vacuum chamber size considerations, intra-voltage element spacing considerations, available numbers of vacuum feedthroughs, available number of voltage control channels in a power supply or controller, or the like.

In FIG. 8C, voltage element array 802 includes a variety of operational regions. For example, regions 816, 817, and 818 may correspond to field free regions, with each region shown as tied individually to a common potential, 821, 822, and 823, respectively. Again, the voltage elements in regions 816, 817, and 818 are illustrated in white to depict that no intentionally applied electric field is present within the field free regions. A number of the voltage elements are established with individual potentials to operate as electrostatic mirrors 826, 827, 828, and 829. By this configuration, region 816 may operate as a first charged particle trap bounded by the electrostatic mirrors 826 and 827, while region 818 may operate as a second charged particle trap bounded by the electrostatic mirrors 828 and 829. Other configurations may be established with additional charged particle traps, such as two or more positively charged particle traps and one or more negatively charged particle traps.

Region 817 may operate, for example, as an interaction region where charged particles trapped in region 816 and in region 818 may be directed toward one another. For counter propagating positively and negatively charged particle groups, plasma self-compression, as described herein may occur during overlap of the charged particle groups in the interaction region. To inject the charged particles trapped in regions 816 and 818 into region 817, the potentials applied voltage elements of electrostatic mirrors 827 and 828 may be timed and controlled to, at least temporarily, reduce the electrostatic barrier for the trapped charged particles established by the voltage elements of electrostatic mirrors 827 and 828 to allow the charged particles to travel into region 817. After the charged particles travel from regions 816 and 818 into region 817, the potentials applied to voltage elements of electrostatic mirrors 827 and 828 may be re-established or modified to allow further operation as electrostatic mirrors or for another configuration.

For fusion trap system configurations, it may be desirable to separately trap multiple positively charged particle groups in individual traps, with a group of negatively charged particles trapped a distance away in another individual trap and a central region between the trapped negatively charged particle group and positively charged particle groups. For example, the three charged particle traps can be used as bunch injectors or emitters of groups to be directed at one another, with the two populations of positive ion groups trapped separately in the two positive ion traps, and the electron groups trapped into the electron trap. The two ion traps may be used to trap an increasing population of independent positive ions, for example generated by positive ion sources including a source of gas and an ionizer placed on one side of the central field free region (e.g., established by configuring a large number of voltage elements in the system appropriately) and along a common axis. The single electron trap may trap an increasing population of electrons, generated by way of an electron source, such as a heated emitter, placed on the opposite side of the field free region and along the common axis.

Using computer or automated control, the three traps each may then have one of their electrostatic mirrors modified (potential barrier lowered or made field free) with appropriate timings, causing the release of the stored positive ion groups and electron groups from their respective traps, and toward the central field free region, with the positive ion groups having different velocities, for example. Having been emitted all along the same common axis, there now exist two positive ion groups moving in the same direction toward the central field free region, and one electron group moving in the opposite direction toward that same central field free region. Upon overlap at an interaction region, the interactions between ions and electrons may establish a radially compressive force on all the charged particles, and the groups may then move through and past one another and toward the opposite ends of the system, away from where they started as independent groups.

Advantageously, the voltage elements may be dynamically reconfigured to maintain the ions and electrons in the system, by establishing, at least temporarily, sufficiently high potential barriers and field free regions, in appropriate positions and with appropriate timings. For example, once the two positive ion groups and electron groups reach the opposite ends of the system, they can be trapped or simply reflected by appropriate potentials at the electrostatic mirrors opposite to their corresponding starting positions in the system, with the electric fields established by computer or automated control. For a simple reflection, the potential barriers may be established of a sufficient height by controlling potentials on appropriate voltage elements to decelerate the charged particle groups and re-accelerate them toward the central field free region. If the voltage elements are controlled to trap the charged particle groups, the charged particle groups can be trapped for a period of time, and, if an appropriate charged particle source is available at the new trapping location, additional charged particles can be optionally added to each group independently. After this period of time, the system may be operated again as above to direct the two groups of positive ions and the group of electrons toward each other and the central field free region again. In either case, when the charged particle groups overlap where the overlapping bunches may be subjected to radial compression.

VI. Control of Voltage Elements

Figure 9:
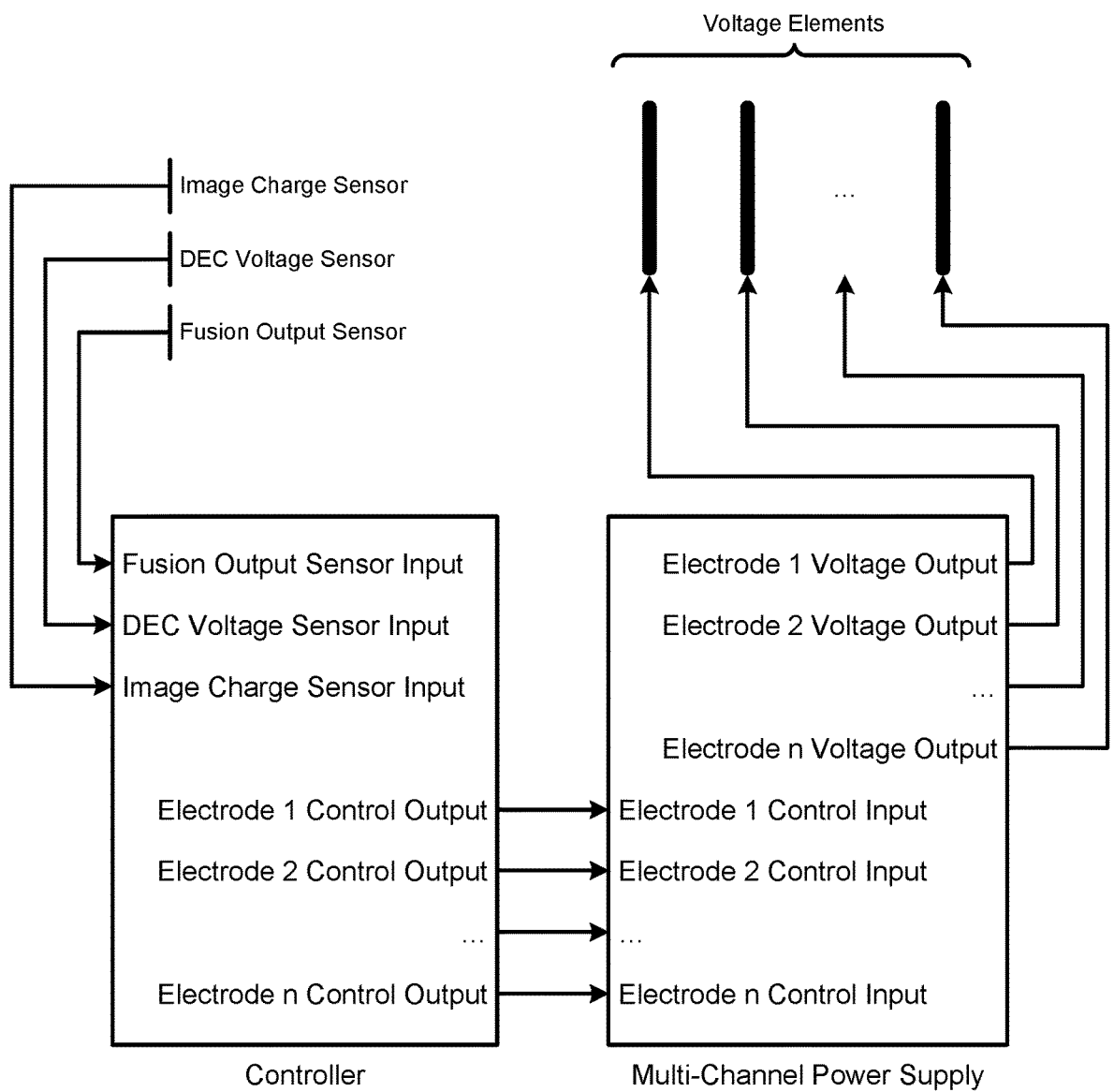
FIG. 9 illustrates an example circuit that includes a controller, voltage elements, sensors, and a power supply according to various embodiments.

FIG. 9 shows an example voltage control circuit that includes a controller, sensors, voltage elements of a plasma compression or fusion trap system, and a multi-channel power supply according to various embodiments. The controller may be used to output signals to the multi-channel power supply to direct the multi-channel power supply to output voltages for application to the various voltage elements.

Various sensors may provide signals to the controller, such as a fusion output sensor, a DEC (direct energy converter) voltage sensor, and an image charge sensor. For example, these and other sensors may be used to provide information, in real time, about the position and velocity of various charged particles in a plasma compression or fusion trap system, as well as general operational conditions of the system and information about the compression of a plasma or the occurrence of fusion reactions. The information provided to the controller by the sensors may be used to adjust the timing and magnitude of voltages applied to the various voltage elements in the plasma compression or fusion trap system.

The controller may use various automated timing information coupled with sensor signals to provide a suitable set of time-varying voltage conditions for output to the voltage elements. For example, the controller may determine appropriate moments to adjust voltage conditions applied to each of the individual voltage elements to direct charged particles according to a target trajectory. The controller may be used for controlling operation of the voltage elements according to various operational configurations, such as described above with reference to FIG. 1, 3A-3D, 4A-4D, 5A-5C, 6, or 7 or for the dynamically reconfigurable voltage element array configurations of FIGS. 8A-8C. Optionally, the controller may include a user input panel or other interface for receiving user provided inputs for manually adjusting timing, voltages, etc. User inputs may be received digitally, such as via one or more switches or via one or more digital input interfaces. Optionally, user inputs may be received as analog signals.

The multi-channel power supply may receive control signals from the controller for each electrode or voltage element and then generate the output voltages. Control signals may be digital or analog and may be low voltage signals that are converted by the power supply to higher voltage output for application to the voltage elements. As illustrated, any number of channels may be included in a multi-channel power supply. In some embodiments, multiple individual- or multi-channel power supplies may be used.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. For example, the control circuitry can comprise or include a computer system or one or more processors programmed or configured to perform various aspects. A control system that is configured to perform operations or actions may be programmed, arranged, or otherwise adapted to perform the operations or actions. Aspects described herein may be embodied as non-transitory computer readable program instructions that, when executed by one or more processors, cause the one or more processors to perform operations, such as one or more portions of the methods described herein. Although presented as numbered or ordered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A system comprising:
    a first particle source arranged to direct negatively charged particles along an axis;
    a second particle source arranged to direct positively charged particles along the axis;
    a first voltage element arranged along the axis for controlling a first axial velocity of negatively charged particles from the first particle source; and
    a second voltage element arranged along the axis for controlling a second axial velocity of positively charged particles from the second particle source; and
    control circuitry configured to:
        control the first voltage element to direct a first group of negatively charged particles along the axis, wherein the first group of negatively charged particles extends radially from the axis and is characterized by a first radial distribution,
        control the second voltage element to direct a second group of positively charged particles along the axis, wherein the second group of positively charged particles extends radially from the axis and is characterized by a second radial distribution, and
        control the first voltage element and the second voltage element to control the first axial velocity of the first group of negatively charged particles and the second axial velocity of the second group of positively charged particles and simultaneously position the first group of negatively charged particles and the second group of positively charged particles in an interaction region while the first group of negatively charged particles and the second group of positively charged particles are moving in opposite directions, wherein interactions between the first group of negatively charged particles and the second group of positively charged particles in the interaction region result in narrowing one or both of the first radial distribution or the second radial distribution.

2. The system of claim 1, wherein the control circuitry is further configured to:
    control the first voltage element and the second voltage element to control the first axial velocity of the first group of negatively charged particles and the second axial velocity of the second group of positively charged particles to redirect the first group of negatively charged particles and the second group of positively charged particles and simultaneously re-position the first group of negatively charged particles and the second group of positively charged particles in the interaction region an additional time while the first group of negatively charged particles and the second group of positively charged particles are moving in opposite directions, wherein further interactions between the first group of negatively charged particles and the second group of positively charged particles in the interaction region result in further narrowing of one or both of the first radial distribution or the second radial distribution.

3. The system of claim 1, wherein the first group of negatively charged particles comprises an electron beam or an electron bunch, and wherein the second group of positively charged particles comprises a positive ion beam or a positive ion bunch.

4. The system of claim 1, wherein the second group of positively charged particles comprises two or more different positive ion species.

5. The system of claim 1, wherein the first voltage element corresponds to a first pair of voltage elements, wherein the second voltage element corresponds to a second pair of voltage elements, wherein the interaction region is positioned between the first pair of voltage elements, and wherein the interaction region is positioned between the second pair of voltage elements.

6. The system of claim 1, wherein at least a portion of the axis is curved, or wherein the system further comprises one or more charged particle deflectors arranged to deflect the first group of negatively charged particles and the second group of positively charged particles so that the axis corresponds to a ring configuration.

7. The system of claim 1, wherein the interaction region includes equal numbers of negatively charged particles and positively charged particles when the first group of negatively charged particles and the second group of positively charged particles are simultaneously positioned in the interaction region.

8. The system of claim 1, wherein the first group of negatively charged particles is characterized by a first volume, wherein the second group of positively charged particles is characterized by a second volume, and wherein the interaction region corresponds to a region where the first volume and the second volume overlap.

9. The system of claim 1, further comprising:
a first charged particle trap positioned to receive negatively charged particles from the first particle source; and
a second charged particle trap positioned to receive positively charged particles from the second particle source.

10. The system of claim 1, wherein the first voltage element corresponds to a first pair of voltage elements, wherein the second voltage element corresponds to a second pair of voltage elements, and wherein the control circuitry is further configured to:
control the first pair of voltage elements and the second pair of voltage elements to control the first axial velocity of the first group of negatively charged particles and the second axial velocity of the second group of positively charged particles to oscillate the first group of negatively charged particles between the first pair of voltage elements and to oscillate the second group of positively charged particles between the second pair of voltage elements in order to repeatedly simultaneously position the first group of negatively charged particles and the second group of positively charged particles in the interaction region while the first group of negatively charged particles and the second group of positively charged particles are moving in opposite directions.

11. The system of claim 1, further comprising
a third particle source arranged to direct positively charged particles along the axis, wherein the second voltage element is further arranged for controlling a third axial velocity of a third group of positively charged particles from the third particle source, wherein the third group of positively charged particles extends radially from the axis and is characterized by a third radial distribution, and wherein the control circuitry is configured to:
control the first voltage element and the second voltage element to control the first axial velocity of the first group of negatively charged particles, the second axial velocity of the second group of positively charged particles, and a third axial velocity of the third group of positively charged particles and simultaneously position the first group of negatively charged particles, the second group of positively charged particles, and the third group of positively charged particles in the interaction region while the first group of negatively charged particles moves in an opposite direction to the second group of positively charged particles and the third group of positively charged particles, and wherein interactions between the first group of negatively charged particles, the second group of positively charged particles, and the third group of positively charged particles in the interaction region result in narrowing of one or more of the first radial distribution, the second radial distribution, or the third radial distribution.

12. The system of claim 11, wherein the control circuitry is configured to:
control one or both of the second axial velocity or the third axial velocity to increase a relative velocity between the second group of positively charged particles and the third group of positively charged particles; and
wherein the system further comprises a direct energy converter, the direct energy converter configured to:
collect charged fusion products from fusion reactions between positively charged particles of the second group of positively charged particles and the third group of positively charged particles; and
convert kinetic energy from collected charged fusion products to electrical energy.

13. The system of claim 1, wherein the first particle source comprises a first plasmoid, or wherein the second particle source comprises a second plasmoid.

14. A method for concentrating charged particles, the method comprising:
directing, by a first particle source, a first group of negatively charged particles along an axis, wherein the first group of negatively charged particles extends radially from the axis and is characterized by a first radial distribution;
directing, by a second particle source, a second group of positively charged particles along the axis, wherein the second group of positively charged particles extends radially from the axis and is characterized by a second radial distribution; and
controlling, by control circuitry, a first axial velocity of the first group of negatively charged particles and a second axial velocity of the second group of positively charged particles to simultaneously position the first group of negatively charged particles and the second group of positively charged particles in an interaction region while the first group of negatively charged particles and the second group of positively charged particles are moving in opposite directions, wherein interactions between the first group of negatively charged particles and the second group of positively charged particles in the interaction region result in narrowing of one or both of the first radial distribution or the second radial distribution.

15. The method of claim 14, further comprising:
controlling the first axial velocity of the first group of negatively charged particles and the second axial velocity of the second group of positively charged particles to redirect the first group of negatively charged particles and the second group of positively charged particles and simultaneously re-position the first group of negatively charged particles and the second group of positively charged particles in the interaction region an additional time while the first group of negatively charged particles and the second group of positively charged particles are moving in opposite directions, wherein further interactions between the first group of negatively charged particles and the second group of positively charged particles in the interaction region result in further narrowing of one or both of the first radial distribution or the second radial distribution.

16. The method of claim 14, wherein the first group of negatively charged particles comprises an electron beam or an electron bunch, and wherein the second group of positively charged particles comprises a positive ion beam or a positive ion bunch or wherein the second group of positively charged particles comprises two or more different positive ion species.

17. The method of claim 14, wherein at least a portion of the axis is curved or wherein the method further comprises deflecting the first group of negatively charged particles and the second group of positively charged particles so that the axis corresponds to a ring configuration.

18. The method of claim 14, further comprising:
generating the first group of negatively charged particles using a first particle source;
storing the first group of negatively charged particles in a first charged particle trap, wherein directing the first group of negatively charged particles includes accelerating the first group of negatively charged particles out of the first charged particle trap in a first direction;
generating the second group of positively charged particles using a second particle source; and
storing the second group of positively charged particles in a second charged particle trap, wherein directing the second group of positively charged particles includes accelerating the second group of positively charged particles out of the second charged particle trap in a second direction.

19. The method of claim 14, further comprising:
directing a third group of positively charged particles in a third direction along the axis, wherein the third group of positively charged particles extends radially from the axis and is characterized by a third radial distribution, wherein controlling includes controlling the first axial velocity of the first group of negatively charged particles, the second axial velocity of the second group of positively charged particles, and a third axial velocity of the third group of positively charged particles to simultaneously position the first group of negatively charged particles, the second group of positively charged particles, and the third group of positively charged particles in the interaction region while the first group of negatively charged particles moves in an opposite direction to the second group of positively charged particles and the third group of positively charge particles, and wherein interactions between the first group of negatively charged particles, the second group of positively charged particles, and the third group of positively charged particles in the interaction region result in narrowing of one or more of the first radial distribution, the second radial distribution, or the third radial distribution.

20. The method of claim 19, further comprising:
controlling one or both of the second axial velocity or the third axial velocity to increase a relative velocity between the second group of positively charged particles and the third group of positively charged particles;
collecting charged fusion products from fusion reactions between positively charged particles of the second group of positively charged particles and the third group of positively charged particles; and
converting kinetic energy from collected charged fusion products to electrical energy.

* * * * *